(12) United States Patent
Aminaka et al.

(10) Patent No.: US 10,856,334 B2
(45) Date of Patent: *Dec. 1, 2020

(54) METHOD AND DEVICE FOR ALLOCATING COMMON CHANNEL RESOURCES

(71) Applicant: NEC CORPORATION, Tokyo (JP)

(72) Inventors: Hiroaki Aminaka, Tokyo (JP); Kojiro Hamabe, Tokyo (JP); Jinsock Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 16/276,171

(22) Filed: Feb. 14, 2019

(65) Prior Publication Data
US 2019/0182871 A1    Jun. 13, 2019

Related U.S. Application Data

(63) Continuation of application No. 15/361,567, filed on Nov. 28, 2016, now Pat. No. 10,244,560, which is a
(Continued)

(30) Foreign Application Priority Data

Oct. 2, 2007    (JP) .................................. 2007-258342

(51) Int. Cl.
    *H04W 74/08*    (2009.01)
    *H04W 74/00*    (2009.01)

(52) U.S. Cl.
    CPC ..... *H04W 74/0833* (2013.01); *H04W 74/008* (2013.01)

(58) Field of Classification Search
    USPC ......................................................... 370/329
    See application file for complete search history.

(56) References Cited

U.S. PATENT DOCUMENTS

2005/0014508 A1    1/2005    Moulsley et al.
2005/0117536 A1    6/2005    Cho et al.
(Continued)

FOREIGN PATENT DOCUMENTS

CN    1252680 A    5/2000
CN    1342379 A    3/2002
(Continued)

OTHER PUBLICATIONS

Communication dated Jun. 28, 2019, from the National Intellectual Property Administration, PRC in counterpart Application No. 201610298906.5.
(Continued)

*Primary Examiner* — Gregory B Sefcheck
*Assistant Examiner* — Majid Esmaeilian
(74) *Attorney, Agent, or Firm* — Sughrue Mion, PLLC

(57) ABSTRACT

A resource allocation method and device are provided that can achieve uniform loads on and stable quality of a common channel available to mobile stations having no dedicated channels. A method for allocating common channel resources in a system in which a plurality of first radio communication devices transmit data to a second radio communication device over a common channel, based on first resource allocation information, includes: by the second radio communication device, transmitting second resource allocation information to at least one of the first radio communication devices; and by each of the first radio communication devices, transmitting data to the second radio communication device over the common channel, based on any one of the first resource allocation information and the second resource allocation information.

20 Claims, 29 Drawing Sheets

Related U.S. Application Data continuation of application No. 13/289,023, filed on Nov. 4, 2011, now Pat. No. 9,544,918, which is a continuation of application No. 12/243,789, filed on Oct. 1, 2008, now Pat. No. 9,241,347.

(56) References Cited

U.S. PATENT DOCUMENTS

| | | |
|---|---|---|
| 2005/0281212 A1 | 12/2005 | Jeong et al. |
| 2006/0111104 A1 | 5/2006 | Hyslop |
| 2007/0047493 A1 | 3/2007 | Park et al. |
| 2007/0064665 A1 | 3/2007 | Zhang et al. |
| 2007/0123291 A1 | 5/2007 | Moulsley et al. |
| 2007/0206531 A1 | 9/2007 | Pajukoshi et al. |
| 2007/0223422 A1 | 9/2007 | Kim et al. |
| 2007/0258404 A1 | 11/2007 | Tirkkonen et al. |
| 2009/0011769 A1* | 1/2009 | Park .................. H04W 74/0866 455/450 |
| 2009/0086673 A1* | 4/2009 | Aminaka .......... H04W 74/0833 370/329 |
| 2009/0257407 A1 | 10/2009 | Park et al. |
| 2011/0007700 A1* | 1/2011 | Aminaka .......... H04W 72/0413 370/329 |

FOREIGN PATENT DOCUMENTS

| | | | |
|---|---|---|---|
| CN | 1521991 | A | 8/2004 |
| CN | 1692605 | A | 11/2005 |
| CN | 1762115 | A | 4/2006 |
| CN | 1264300 | C | 7/2006 |
| JP | 2002528997 | A | 9/2002 |
| JP | 2003513534 | A | 4/2003 |
| JP | 2003513573 | A | 4/2003 |
| JP | 200432211 | A | 1/2004 |
| JP | 2007522763 | A | 8/2007 |
| JP | 2011155689 | A | 8/2011 |
| KR | 10-2005-0038977 | A | 4/2005 |
| WO | 03/003643 | A1 | 1/2003 |
| WO | 2006/075042 | A1 | 7/2006 |
| WO | 2007/024791 | A2 | 3/2007 |
| WO | 2007029977 | A1 | 3/2007 |
| WO | 2007/052971 | A1 | 5/2007 |
| WO | 2007091420 | A1 | 8/2007 |
| WO | 2007091831 | A2 | 8/2007 |
| WO | 2007052753 | A1 | 10/2007 |

OTHER PUBLICATIONS

3GPP TS 25.211 V7.2.0 (May 2007).
3GPP TS 25.214 V7.5.0 (May 2007).
3GPP TS 25.321 V7.2.0 (Sep. 2006).
3GPP TS 25.331 V7.3.0 (Dec. 2006).
3GPP TSG-RAN WG2 Meeting #57 St. Louis, USA, Feb. 12-16, 2007.
Communication dated Apr. 17, 2012 issued by the United States Patent and Trademark Office in U.S. Appl. No. 12/243,789.
U.S. Office Action dated Dec. 21, 2012 in U.S. Appl. No. 12/243,789.
U.S. Office Action dated Dec. 7, 2012 in related U.S. Appl. No. 13/289,023.
Office Action dated Dec. 5, 2012 issued by the Japanese Patent Office in counterpart Japanese Application No. 2011-095614.
Communication dated Sep. 10, 2014, from the U.S. Patent and Trademark Office in counterpart U.S. Appl. No. 13/289,023.
Japanese Office Action dated May 23, 2012 issued by the Japanese Patent Office in counterpart Japanese Application No. 2011-095614.
Communication dated Aug. 27, 2018 from the State Intellectual Property Office of the P.R.C. in counterpart Application No. 201610298906.5.

* cited by examiner

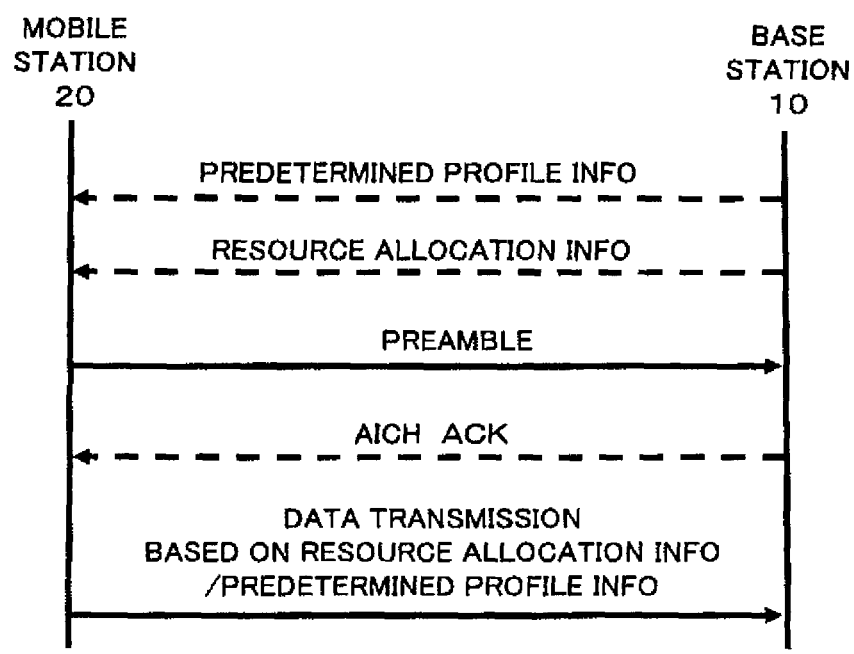

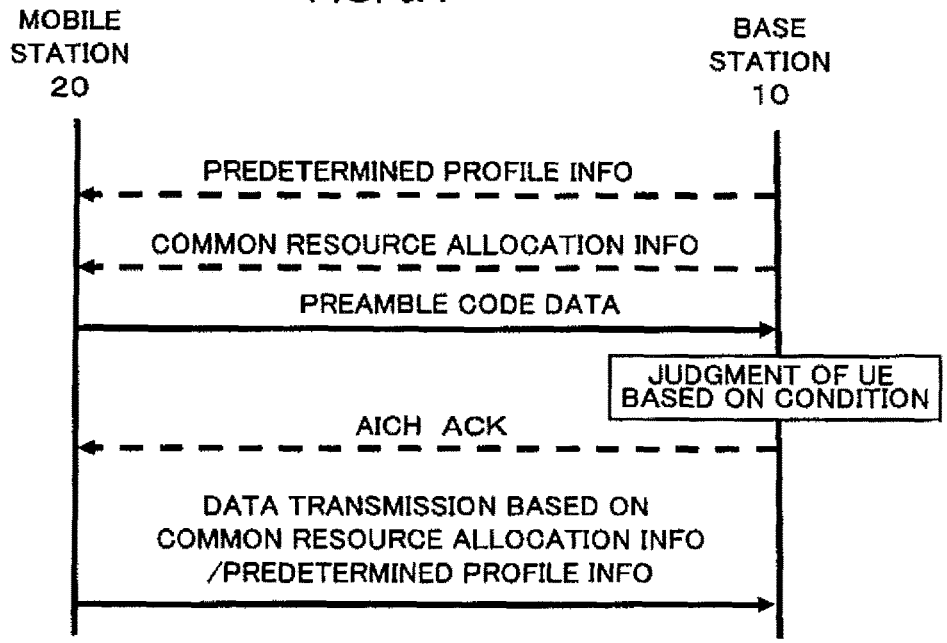
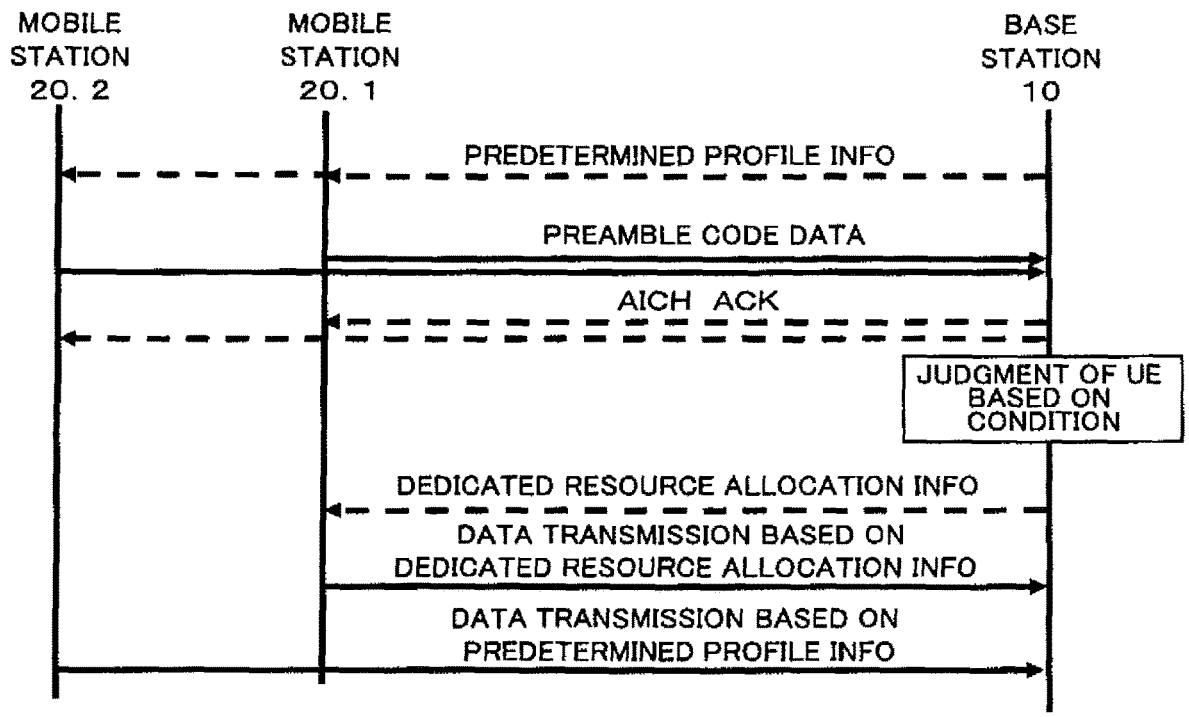

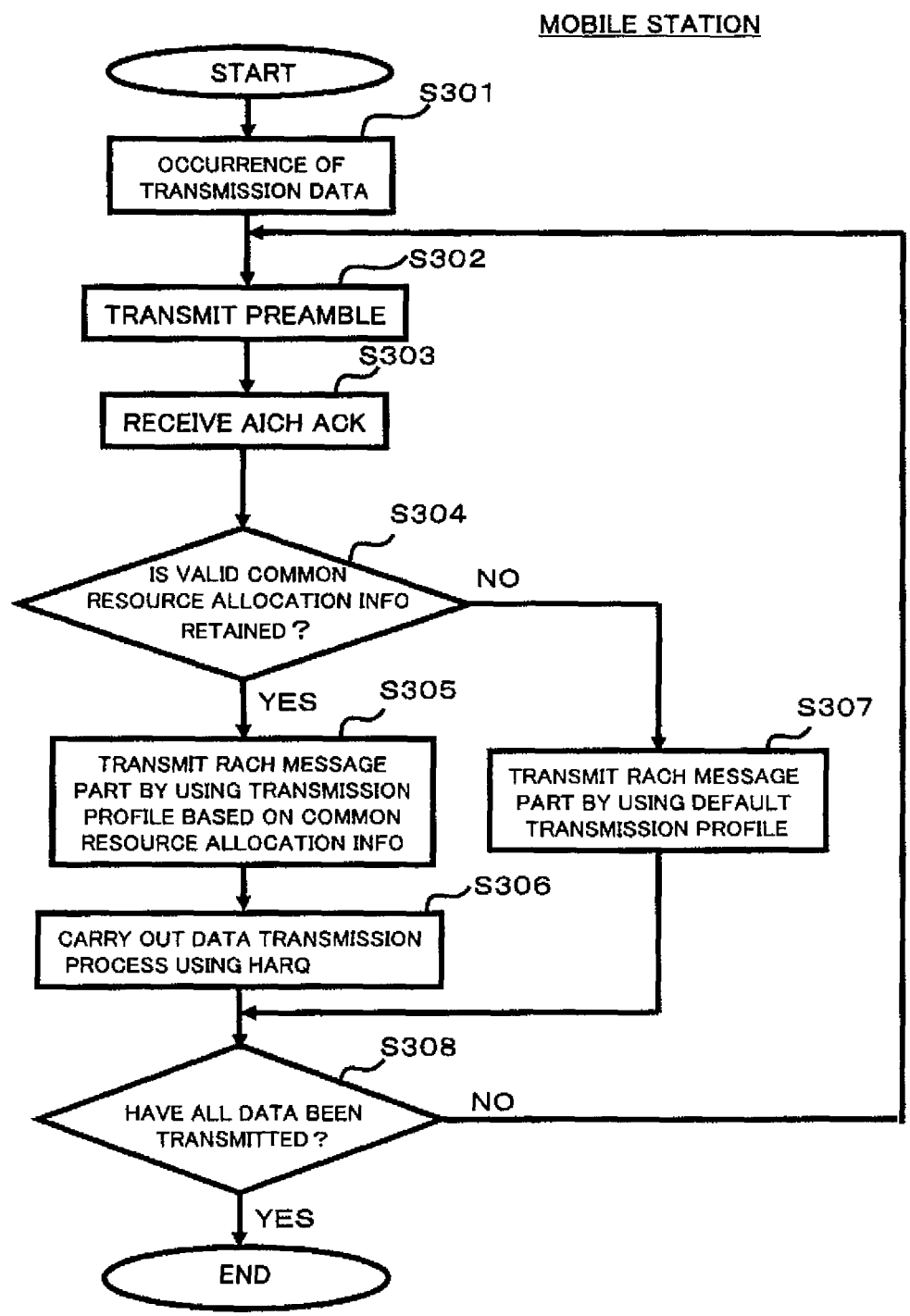

BASE STATION (4) AICH ACK

METHOD AND DEVICE FOR ALLOCATING COMMON CHANNEL RESOURCES

CROSS REFERENCE TO RELATED APPLICATIONS

This application is a Continuation of application Ser. No. 15/361,567, filed Nov. 28, 2016, which is a Continuation of application Ser. No. 13/289,023, now U.S. Pat. No. 9,544,918, filed Nov. 4, 2011, which is a Continuation of application Ser. No. 12/243,789, now U.S. Pat. No. 9,241,347, filed Oct. 1, 2008 which is based upon and claims the benefit of priority from Japanese Patent Application No. 2007-258342, filed on Oct. 2, 2007, the disclosures of the prior applications are incorporated herein in their entirety.

BACKGROUND OF THE INVENTION

Field of the Invention

The present invention relates to a radio communications system and, more particularly, to a resource allocation technique for a common channel in a radio communications system.

Description of the Related Art

In wideband-code division multiple access (W-CDMA), which is a third-generation mobile communications system, a mobile station (UE (user equipment)) in CELL_FACH state does not have a specified base station but selects an optimal base station every time it performs communication. Moreover, since a mobile station in CELL_FACH state is not assigned a dedicated channel, it performs uplink data transmission/downlink data reception by using a common channel. The operations of a random access channel (RACH), which is an uplink common channel, are defined by 3GPP (Third Generation Partnership Project, which is a project for standardization of 3G mobile communications systems) specifications (see 3GPP TS25.214 v7.5.0, 3GPP TS25.321 v7.2.0, 3GPP TS25.331 v7.3.0, and 3GPP TS25.211 v7.2.0). Hereinafter, the operations of the uplink common channel, RACH, will be described briefly with reference to FIGS. 1 to 3.

FIG. 1 is a block diagram showing a structure of a mobile communications system in general. Here, to avoid complicating the description, it is assumed that a plurality of mobile stations (here, 20.1 to 20.4) are located within the cell of a base station 10, with each mobile station being in CELL_FACH state, and the base station 10 being connected to an upper network device 30. Note that, in the following description, an expression "mobile station 20" will be used when an arbitrary mobile station is indicated.

FIG. 2 is a diagram of the structure of the uplink common channel, RACH. FIG. 3A is a RACH sequence diagram, and FIG. 3B is a table showing an example of preamble-part code data components and base station's responses. Referring to FIG. 2, an uplink communication has a RACH message part for transmitting a message body and a preamble part for providing timing before the transmission of the RACH message part. For a downlink communication, an acquisition indicator channel (AICH) is provided, which is a downlink channel for responding to a preamble part received from a mobile station.

In RACH, spreading codes called "preamble signature $C_{sig,s}$" and "preamble scrambling code $S_{r-pre,n}$" as described below are used. The preamble scrambling code $S_{r-pre,n}$ is a code for cell identification, which is notified by a base station. The preamble signature $C_{sig,s}$ is one randomly selected from among predetermined preamble signatures $C_{sig,1}, C_{sig,2}, \ldots C_{sig,m}$ by each mobile station and has a one-to-one association with a channelization code, which will be described later.

The code data $C_{pre,n,s}$ of the RACH preamble part is composed of a preamble signature $C_{sig,s}$ and a preamble scrambling code $S_{r-pre,n}$, as represented by the following equation 1 (see FIG. 3B).

$$C_{pre,n,s}(k) = S_{r-pre,n}(k) \times C_{sig,s}(k) \times e^{j(\frac{\pi}{4}+\frac{\pi}{2}k)} \quad (1)$$

where k=0, 1, 2, 3, . . . , and 4095, $C_{pre,n,s}$ is preamble-part code data, $S_{r-pre,n}$ is a preamble scrambling code, and $C_{sig,s}$ is a preamble signature.

On AICH, a response (ACK/NACK) to a preamble is transmitted to the mobile station, using a code pattern corresponding to the preamble signature of the preamble.

The RACH message part is composed of a RACH message control part for transmitting a control signal and a RACH message data part for transmitting data. The RACH message part is coded by using a channelization code associated with the preamble signature, then I/Q-multiplexed, and then further coded by using a scrambling code associated with the preamble scrambling code.

As shown in FIGS. 2 and 3A, a mobile station 20 first generates preamble-part code data by using a preamble scrambling code notified from the base station 10 and a preamble signature the mobile station 20 has randomly selected itself. The mobile station 20 transmits the preamble-part code data to the base station 10 with transmission power of an initial value, which is calculated from the amount of the received power of a pilot channel from the base station 10.

In response to the received preamble, the base station 10 transmits a response to the mobile station 20 by using AICH. In this transmission, the base station 10 also transmits to this mobile station 20 information about the responses to all preamble signatures. For example, the base station 10 notifies the mobile station 20 of information including the preamble signatures $C_{sig,1}, C_{sig,2}, \ldots, C_{sig,m}$ and responses (ACK, NACK, or No ACK) to these preamble signatures shown in FIG. 3B.

For example, to a preamble signature that is used in a preamble successfully received by the base station 10, a response "ACK" indicates that a mobile station which has selected this preamble signature is allowed to transmit a RACH message at a predetermined timing. When a mobile station is not allowed to, "NACK" is notified. Moreover, to a preamble signature that is not used in the successfully received preamble, "No ACK" is set as a response on AICH. Note that the base station 10 sometimes does not transmit a response over AICH when there is no preamble successfully received.

Upon receipt of a response over AICH, when ACK is the response to the preamble signature used in the preamble transmission, then the mobile station 20 determines a RACH message part transmission profile by using some method, which will be described later, and transmits data to the base station 10. If NACK is the response to the preamble signature used in the preamble transmission, the mobile station 20 starts a preamble transmission procedure again in a predetermined length of time. When No ACK is the response to the preamble signature used in the preamble transmission, the mobile station 20 determines that the base station 10 has failed to receive the preamble last transmitted and, if the number of retransmissions does not reach an upper limit yet, retransmits the preamble with transmission power increased by a predetermined amount.

Incidentally, as shown in FIG. 2, a minimum retransmission interval $\tau_{p\text{-}p,min}$ between retransmissions of a preamble part, an interval $\tau_{p\text{-}a}$ between a transmission of a preamble part and a transmission of a response over AICH, and an interval $\tau_{p\text{-}m}$ between a transmission of a preamble part and a transmission of a RACH message part are individually predetermined.

The RACH message part transmission profile includes an offset value of the transmission power of the RACH message part (RACH message part transmission power offset value), a scrambling code, a channelization code, and a transmission timing. The transmission power offset value of a RACH message part can be obtained from the value of the transmission power of the preamble last transmitted by the mobile station 20 before the receipt of ACK over AICH. Moreover, the scrambling code has a one-to-one correspondence with the preamble scrambling code used in the preamble transmission, and the channelization code has a one-to-one correspondence with the preamble signature used in the preamble transmission. Furthermore, the transmission timing is determined based on the time when the preamble part was transmitted, because the interval $\tau_{p\text{-}m}$ between a preamble part transmission and a RACH message part transmission is predetermined as shown in FIG. 2.

The RACH message part is composed of the RACH message control part and RACH message data part as mentioned above already. The transmission power values of these parts can be calculated by using the following equations (2) and (3), respectively.

$$\text{Transmission power of RACH message control part} = P_{preamble,tx} \times \Delta P_{p\text{-}m} \quad (2)$$

$$\text{Transmission power of RACH message data part} = P_{preamble,tx} \times \text{TF\_offset} \quad (3)$$

where $P_{preamble,tx}$ is the value of the transmission power of the preamble last transmitted by the mobile station 20 before the receipt of ACK over AICH, $\Delta P_{p\text{-}m}$ is a transmission power offset value to $P_{preamble,tx}$, and TF_offset is a transmission power offset value corresponding to a data format (TF: Transport Format) in use.

The base station 10 notifies the mobile station 20 of a set of TFs (TFS: Transport Format Set) that are available to mobile stations in the cell for transmission of a RACH message data part, transmission power offset values TF_offset corresponding to the individual TFs, and a transmission power offset value $\Delta P_{p\text{-}m}$ to the value of the transmission power of the preamble ($P_{preamble,tx}$), as default profile information, which is updated at predetermined time intervals.

The mobile station 20 compares the amount of uplink transmission data buffered in the mobile station 20, Buffer_size, with the above-mentioned available TFS and selects the smaller data size. When the sum of the RACH message control part transmission power value and the RACH message data part transmission power value, calculated using the equations (2) and (3), exceeds a preset maximum value MAX_Tx of the transmission power of the RACH message part, the mobile station 20 reselects such a TF that the sum of the RACH message control part transmission power value and the RACH message data part transmission power value does not exceed the maximum transmission power value MAX_Tx. The mobile station 20 then transmits data by using the selected TF.

The uplink common channel, RACH, is defined as described above in 3GPP TS25.214 v7.5.0, 3GPP TS25.321 v7.2.0, 3GPP TS25.331 v7.3.0, and 3GPP TS25.211 v7.2.0. Further, in Text Proposal R2-071076 (3GPP TDoc (written contribution) at meeting), the enhanced peak rate, enhanced line throughput, and a function (Enhanced CELL_FACH) for reduced delay of a downlink communication in CELL_FACH state are defined.

To achieve the enhanced peak rates, enhanced line throughputs, and reduced delays of both uplink and downlink communications in CELL_FACH state defined in 3GPP TDoc R2-071076, it is also necessary to enhance the peak rate and line throughput of RACH and to reduce the delay thereof.

If every mobile station in a cell performs a preamble transmission by using common resource information and receives ACK from a base station over AICH in response to the transmission as described with reference to FIG. 2, then RACH message part transmissions are performed after a predetermined period ($\tau_{p\text{-}m}$) has passed since the respective preamble transmissions. It can be thought that the occurrence of transmission data in each mobile station is a random event. Accordingly, if each mobile station performs a preamble transmission at the timing of the occurrence of transmission data, there are some occasions when preamble transmissions by the mobile stations concentrate. If preamble transmissions concentrate as described above, data transmissions also concentrate after a lapse of the period $\tau_{p\text{-}m}$, resulting in the uplink falling in overloaded state. This may cause problems such as degradation in link quality and frequent failures of data transmission. Although these problems are minor when the transmission rate is low, the problems are significant particularly when the transmission rate is high.

SUMMARY OF THE INVENTION

Accordingly, an object of the present invention is to provide a resource allocation method and device that can achieve uniform loads on and stable quality of a common channel available to mobile stations having no dedicated channels.

According to the present invention, a method for allocating a common channel resource in a system including a plurality of first radio communication devices and a second radio communication device, wherein the plurality of first radio communication devices are capable of performing data transmission via a common channel based on predetermined resource allocation information, includes: at the second radio communication device, transmitting at least one piece of resource allocation information to at least one of the plurality of first radio communication devices; and at each of the plurality of first radio communication devices, performing the data transmission based on one piece of resource allocation information among the predetermined resource allocation information and the at least one piece of resource allocation information.

According to the present invention, a device for allocating a common channel resource for a plurality of radio communication devices to transmit data via a common channel based on predetermined resource allocation information, includes: an identifier for identifying a radio communication device using preambles each received from the plurality of radio communication devices; and a resource allocation controller for allocating a resource for the common channel so as to transmit at least one piece of resource allocation information to at least one of the plurality of radio communication devices, allowing each of the plurality of radio communication devices to perform the data transmission based on one piece of resource allocation information among the predetermined resource allocation information and the at least one piece of resource allocation information.

As described above, according to the present invention, it is possible to achieve uniform loads on and stable quality of a common channel available to mobile stations having no dedicated channels.

BRIEF DESCRIPTION OF THE DRAWINGS

FIG. 4 is a sequence diagram schematically showing a method for allocating common channel resources according to the present invention.

FIG. 5A is a sequence diagram schematically showing a method for allocating uplink common channel resources according to a first exemplary embodiment of the present invention.

FIG. 5B is a sequence diagram schematically showing a method for allocating uplink common channel resources according to a second exemplary embodiment of the present invention.

FIG. 10 is a flow chart showing operations of the mobile station in the first exemplary embodiment of the present invention.

DETAILED DESCRIPTION OF THE PREFERRED EMBODIMENTS

Figure 1:
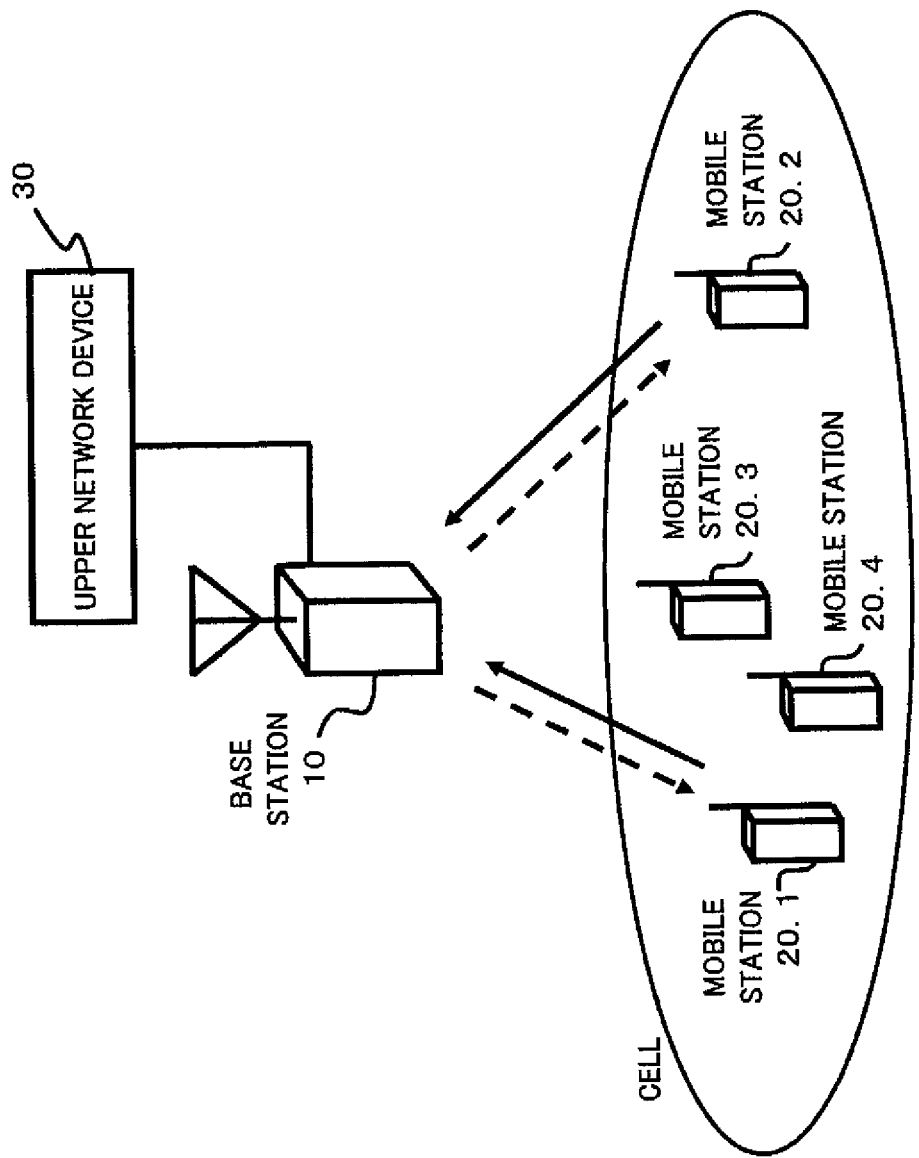
FIG. 1 is a block diagram showing a structure of a mobile communications system in general.
Figure 2:
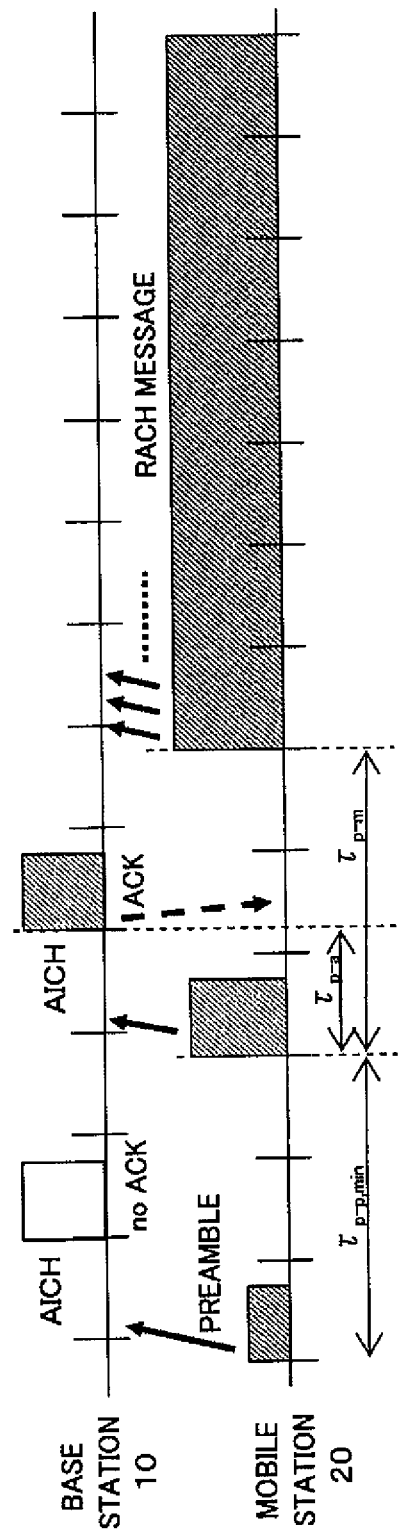
FIG. 2 is a diagram of the structure of an uplink common channel, RACH.
Figures 3A, 3B:
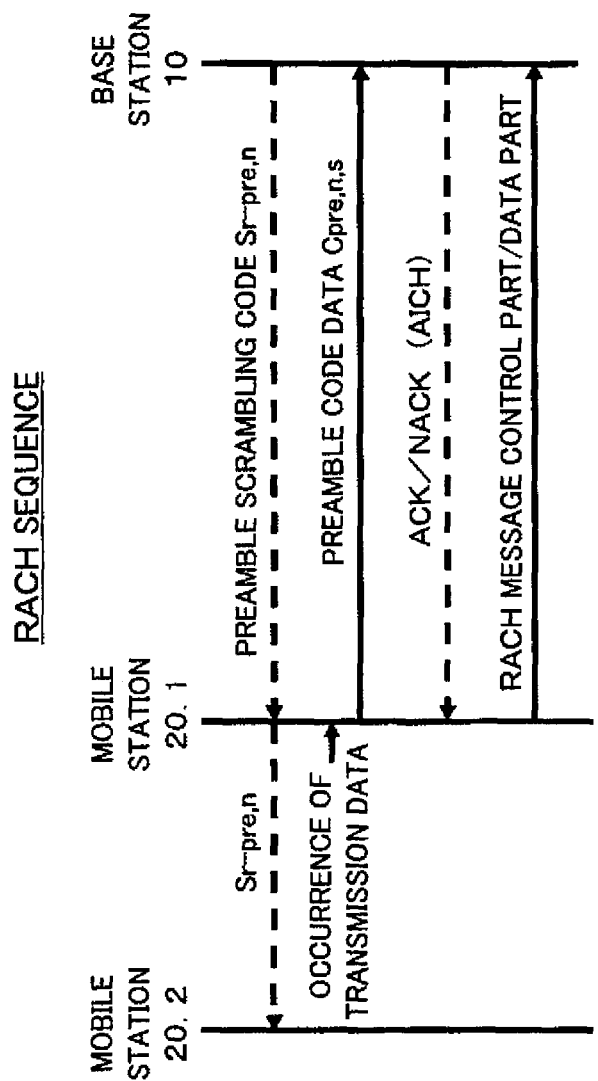
FIG. 3A is a RACH sequence diagram.
FIG. 3B is a table showing an example of preamble-part code data components and base station's responses.

FIG. 4 is a sequence diagram schematically showing a method for allocating common channel resources according to the present invention. Here, an arbitrary mobile station 20 is located in the cell of a base station 10 and is assigned no dedicated channel.

A common channel is available to such mobile stations, and the base station 10 transmits to all mobile stations predetermined profile information (default profile information) enabling the mobile stations to transmit data over the common channel.

The base station 10 further transmits resource allocation information, which is information about allocated resources usable for data transmission, to all mobile stations or part of them. Each mobile station, upon the occurrence of data to transmit, transmits a preamble and, upon the receipt of ACK over AICH from the base station 10, transmits the data to the base station 10 based on any one of the predetermined profile information and resource allocation information. Thus, even if preambles from a plurality of mobile stations concentrate, data transmissions are spread over the resources based on any one of the predetermined profile information and resource allocation information. The followings can be used as the resource allocation information: common resource allocation information, which is notified to a plurality of mobile stations; and dedicated resource allocation information, which is notified to each mobile station individually.

FIG. 5A is a sequence diagram schematically showing a method for allocating uplink common channel resources according to a first exemplary embodiment of the present invention. Here, an arbitrary mobile station 20 is located in the cell of a base station 10, is in CELL_FACH state, and is assigned no dedicated channel. The base station 10 transmits to all mobile stations, at predetermined time intervals, predetermined profile information (default profile information) enabling the mobile stations to transmit data over an uplink common channel, RACH. The base station 10 further transmits common resource allocation information about allocated resources usable for RACH message transmission.

Upon receipt of a preamble from the mobile station 20, the base station 10, in response, judges the mobile station 20 based on a condition or conditions. Using group information including combinations of a preamble signature and a preamble scrambling code, which will be described later, the base station 10 designates a group of mobile stations that will use the common resource allocation information, and transmits ACK to these mobile stations over AICH. Mobile stations each determine a transmission profile by applying the common resource allocation information or predetermined profile information and then transmit data. Thereby, RACH message part transmissions from mobile stations are spread over the default resources and common allocated resources. Thus, uniform loads on and stable quality of the uplink common channel, RACH, can be achieved.

FIG. 5B is a sequence diagram schematically showing a method for allocating uplink common channel resources according to a second exemplary embodiment of the present invention. Mobile stations 20.1 and 20.2 each transmit a preamble to a base station 10 and, as a response to this, each receive ACK from the base station 10 over AICH.

Moreover, the base station 10 judges each mobile station based on a condition or conditions and transmits dedicated resource allocation information to part of the mobile stations (here, the mobile station 20.1). The mobile station 20.1, which has received the dedicated resource allocation information, performs data transmission based on the dedicated resource allocation information, while the mobile station 20.2, which has received no dedicated resource allocation information, performs data transmission based on the predetermined profile information. Thereby, RACH message part transmissions from the mobile stations are spread over the default resources and dedicated allocated resources. Thus, uniform loads on and stable quality of the uplink common channel, RACH, can be achieved.

In addition, as a modified example of the second exemplary embodiment, the following operations are also possible. If the data transmitted by the mobile station 20.1 based on the dedicated resource allocation information is not completely received by the base station 10, the base station 10 notifies the mobile station 20.1 of different dedicated resource allocation information, and the mobile station 20.1 performs data transmission based on the new dedicated resource allocation information. Note that a mobile station that has received no dedicated resource allocation information may transmit a preamble again.

Figure 6:
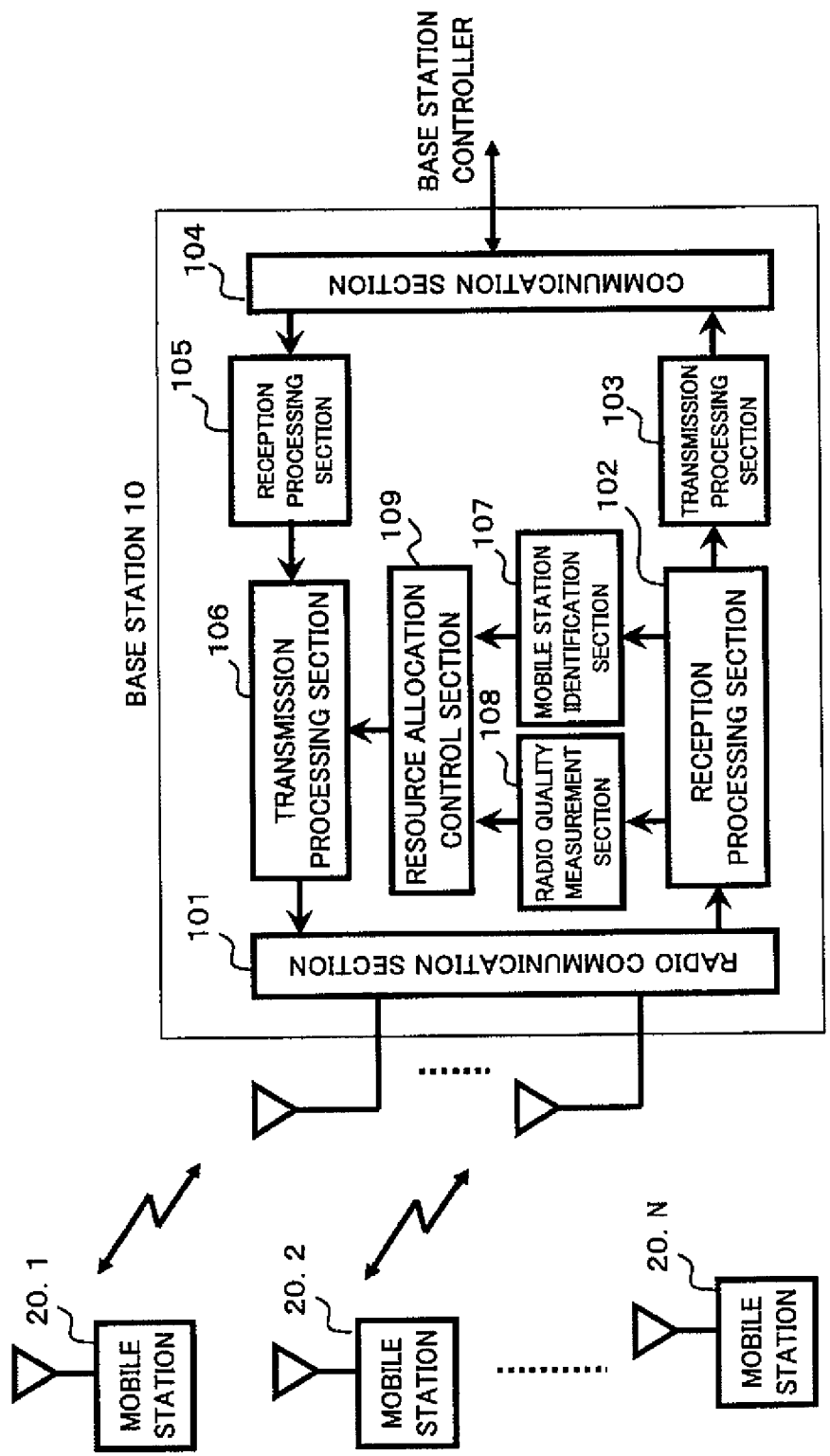
FIG. 6 is a schematic block diagram showing an example of the configuration of a base station in a radio communications system according to the present invention.

FIG. 6 is a schematic block diagram showing an example of the configuration of a base station in a radio communications system according to the present invention. The base station 10 includes a radio communication section 101 that performs radio communication with mobile stations, a reception processing section 102 for processing an uplink signal received from each mobile station, a transmission processing section 103, a communication section 104, a reception processing section 105, and a transmission processing section 106. The transmission processing section 103 and communication section 104 transmit transfer data in the uplink signals to an upper network device (base station controller). Moreover, data from the upper network device is received by the communication section 104 and reception processing section 105 and transmitted to a destination mobile station via the transmission processing section 106 and radio communication section 101.

The base station 10 further includes a mobile station identification section 107, a radio quality measurement section 108, which are connected to the reception processing section 102, and an resource allocation control section 109. The reception processing section 102 transfers data from a mobile station to the mobile station identification section 107 when the data is mobile station identification information, but otherwise transfers data to the transmission processing section 103. The mobile station identification section 107 identifies the mobile station based on the mobile station identification information transferred from the reception processing section 102 and notifies the result to the resource allocation control section 109. The radio quality measurement section 108 measures the received total wideband power (RTWP) at the reception processing section 102 and outputs the measured RTWP value Nc to the resource allocation control section 109.

The resource allocation control section 109 generates resource allocation information, which is information about resources to be allocated to the mobile stations, based on the RTWP value Nc output from the radio quality measurement section 108, and outputs the resource allocation information to the transmission processing section 106.

The transmission processing section 106 transmits out data transferred from the reception processing section 105, as well as the resource allocation information transferred from the resource allocation control section 109, via the radio communication section 101.

Incidentally, regarding the mobile station identification section 107, radio quality measurement section 108, and resource allocation control section 109, equivalent functions can also be implemented by executing programs of the respective corresponding functions on a program-controlled processor such as CPU. Additionally, here, only the sections related to the resource allocation method according to the present invention are shown, and other components are omitted.

Figure 7:
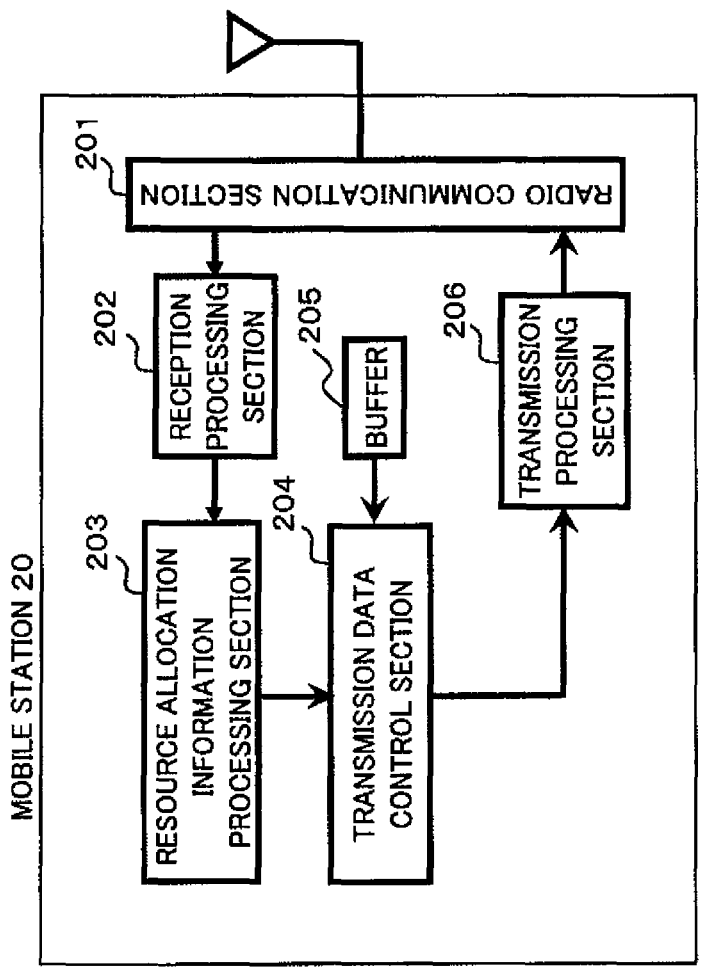
FIG. 7 is a schematic block diagram showing an example of the configuration of a mobile station in the radio communications system according to the present invention.

FIG. 7 is a schematic block diagram showing an example of the configuration of a mobile station in the radio communications system according to the present invention. The mobile station 20 includes a radio communication section 201 that performs radio communication with a base station, a reception processing section 202, a resource allocation information processing section 203, a transmission data control section 204, a buffer 205, and a transmission processing section 206. Here as well, only the sections related to the resource allocation method according to the present invention are shown, and other components are omitted.

The reception processing section 202 receives data from a base station. From resource allocation information transmitted by the base station, the resource allocation information processing section 203 extracts resource information about the resources available on the uplink common channel. This resource information is transferred to the transmission data control section 204.

The transmission data control section 204 determines an uplink common channel transmission profile, based on the resource information input from the resource allocation information processing section 203 and the buffered amount of transmission data accumulated in the buffer 205. The transmission profile determined is output to the transmission processing section 206. When data for uplink transmission is written in the buffer 205, the amount of the data is notified to the transmission data control section 204.

The transmission processing section 206 sets an uplink common channel, based on the transmission profile input from the transmission data control section 204, and transmits data to the base station via the radio communication section 201.

Incidentally, regarding the resource allocation information processing section 203 and transmission data control section 204, equivalent functions can also be implemented by executing programs of the respective corresponding functions on a program-controlled processor such as CPU.

1. First Exemplary Embodiment

In the method for allocating uplink common channel resources according to the first exemplary embodiment of the present invention, a base station transmits common resource allocation information to mobile stations depending on radio conditions, and a mobile station, if ACK is a response over AICH to a preamble that the mobile station has transmitted, determines a RACH message part transmission profile based on the common resource allocation information. The determination of a transmission profile based on the common resource allocation information is performed by mobile stations belonging to a mobile station group, which is formed based on group information including combinations of a preamble signature and a preamble scrambling code, which will be described later. Other mobile stations that do not belong to this group determine a transmission profile based on ordinary default profile information. Thereby, RACH message part transmissions from the mobile stations are spread over the default resources and common allocated resources. Thus, uniform loads on and stable quality of the uplink common channel, RACH, can be achieved.

1.1) Data Transmission Based on Common Resource Allocation Information (Common Scheduling)

Figure 8A:
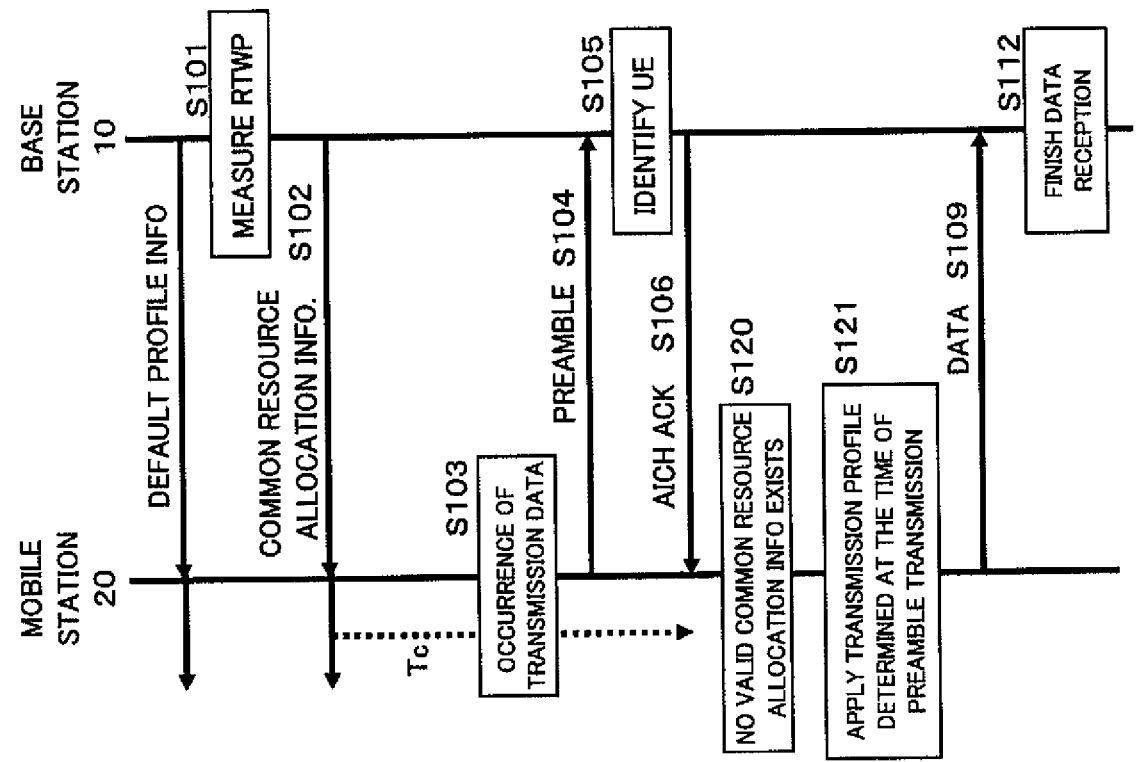
FIG. 8A is a sequence diagram of a data transmission sequence using a transmission profile determined based on common resource allocation information, in the resource allocation method according to the first exemplary embodiment of the present invention.
Figure 8B:
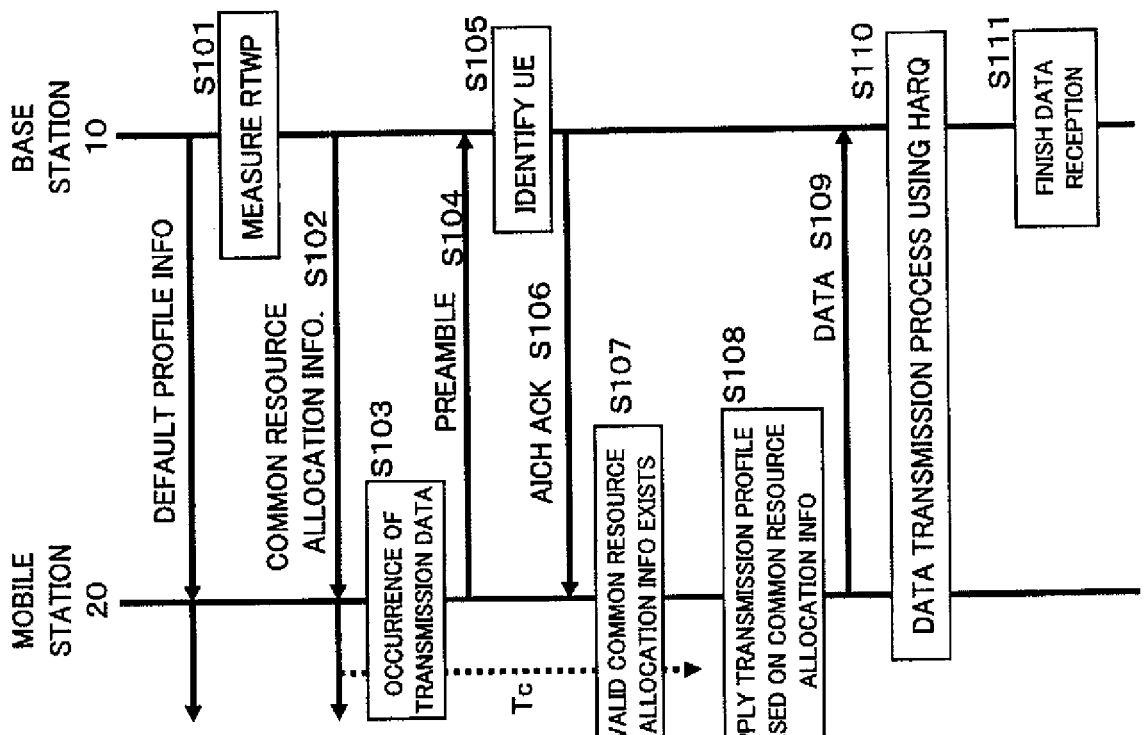
FIG. 8B is a sequence diagram of a data transmission sequence based on default profile information.

FIG. 8A is a sequence diagram of a data transmission sequence using a transmission profile determined based on common resource allocation information, in the resource allocation method according to the first exemplary embodiment of the present invention. FIG. 8B is a sequence diagram of a data transmission sequence based on default profile information.

Referring to FIGS. 8A and 8B, a base station 10 transmits default profile information to all mobile stations located in its cell at predetermined time intervals. Further, the radio quality measurement section 108 of the base station 10 measures RTWP (Nc) (Step S101). This RTWP measurement is repeated at predetermined time intervals.

Based on the measured RTWP value Nc, the resource allocation control section 109 determines common resource allocation information $R_{common}$ and transmits it to the mobile stations (or some designated mobile stations) (Step S102). The reception processing section 202 of any mobile station 20 that has received the common resource allocation information $R_{common}$ retains this common resource allocation information $R_{common}$ for a predetermined period (Tc).

At the mobile station 20, upon the occurrence of data to transmit (transmission data) in the buffer 205 (Step 103), the transmission data control section 204 transmits a preamble to the base station 10 as described above (Step S104). The base station 10, after receiving the preamble, identifies the mobile station 20 based on a predetermined criterion (Step S105) and transmits a response ACK to the mobile station 20 over AICH (Step S106).

As to the predetermined criterion, for example, setting can be made as follows. The resource allocation information processing section 203 of the mobile station 20 divides sets of an available preamble signature (hereinafter, abbreviated as PSIG) and a preamble scrambling code (hereinafter, abbreviated as PSCR) into two groups in advance. If the mobile station 20 is one that receives common resource allocation information and that can execute a data transmission process using a hybrid auto-retransmission request (HARQ), then the mobile station 20 selects a PSIG-PSRC combination from one of the groups. At the base station 10, when the PSIG-PSRC set of a received preamble is one belonging to the one of the groups, the base station 10 determines that the mobile station 20 in question is "a mobile station that receives common resource allocation information and that can execute a HARQ-supported data transmission process." Here, a HARQ-supported data transmission process is defined as a data transmission process using HARQ. On the other hand, when the PSIG-PSRC set of a received preamble is one belonging to the other group, the base station 10 determines that the mobile station 20 in question is a mobile station of another type.

FIG. 8A shows a case in which the resource allocation information processing section 203 of the mobile station 20 receives a response ACK over AICH and retains valid common resource allocation information $R_{common}$ that has not yet used up the predetermined period Tc since it was received (Step S107). When the mobile station 20 has the valid common resource allocation information $R_{common}$ as in this case, the resource allocation information processing section 203 calculates a RACH message part transmission profile Tx_Profile (Step S108), which will be described later, and transmits a RACH message part to the base station 10 by using the transmission profile Tx_Profile (Step S109).

The base station 10 initiates a HARQ process (Step S110) if the source of the received RACH message part is a mobile station that receives common resource allocation information and that can execute a HARQ-supported data transmission process. Finally, the base station 10 transmits transmission acknowledgment information ACK, which will be described later, thus finishing data reception (Step S111).

1.2) Data Transmission Based on Default Profile Information (Default Scheduling)

FIG. 8B shows a case in which the mobile station 20 receives a response ACK over AICH and retains no valid common resource allocation information $R_{common}$, or a case in which the PSIG-PSCR set of a received preamble results in the determination that the mobile station 20 is not "a mobile station that receives common resource allocation information and that can execute a HARQ-supported data transmission process" (Step S120). In this case, the transmission data control section 204 of the mobile station 20 determines a default transmission profile based on the PSCR and PSIG used in the preamble transmission, transmission timing, and default profile information (available TFS, TF_offset corresponding to each TF, and $\Delta P_{p-m}$) (Step S121). The mobile station 20 transmits a RACH message part to the base station 10 by using the default transmission profile (Step S109). When the base station 10 receives the data in the RACH message part after the validity period of the common resource allocation information $R_{common}$ as in this case, the reception processing section 102 finishes data reception (Step S112).

In case where the base station 10 receives the data in the RACH message part from the mobile station 20 within the validity period of the common resource allocation information $R_{common}$ as shown in FIG. 8A, the base station 10 finishes data reception after initiating a HARQ-supported data transmission process. On the other hand, in case where the base station 10 receives the data in the RACH message part not within the validity period of the common resource allocation information $R_{common}$ as shown in FIG. 8B, the base station 10 finishes data reception without initiating HARQ.

In the HARQ process, in response to the data in the RACH message part received within the validity period of the common resource allocation information $R_{common}$, the base station 10 notifies the mobile station 20, over a downlink common channel, of transmission acknowledgment information ACK (HARQ) when the base station 10 has succeeded in decoding, but of transmission acknowledgment information NACK (HARQ) when the base station 10 has failed in decoding. The mobile station 20 retransmits the RACH message part when the transmission acknowledgment information is NACK (HARQ), and the base station 10 combines the previous data, of which decoding has been failed, with the retransmitted data.

1.3) Transmission Profile

The RACH message part transmission profile Tx_Profile includes the following components:

Tx_Profile=[$\Delta P_{p-m}$,TF_offset,TF_selected]

where $\Delta P_{p-m}$ is an offset value of the transmission power of the RACH message control part to the amount of the transmission power of the preamble last transmitted by the mobile station 20 before the receipt of ACK over AICH, TF_offset is a transmission power offset value corresponding to a data format TF used when the mobile station 20 transmits the RACH message, and TF_selected is a data format used when the mobile station 20 transmits the RACH message. The date format TF_selected is determined in such a manner that MAX_TF is compared with the data capacity of the smallest one of TFs that can accommodate Buffer_size and the data format having the smaller data capacity is selected as TF_selected (that is, min[MAX_TF, Buffer_size]), where MAX_TF is a maximum data format usable for the common allocated resources which are allocated by the base station 10 (calculated based on the common resource allocation information $R_{comon}$), and Buffer_size is the amount of data buffered at the mobile station 20.

1.4) Determination of Common Resource Allocation Information

Figure 9A:
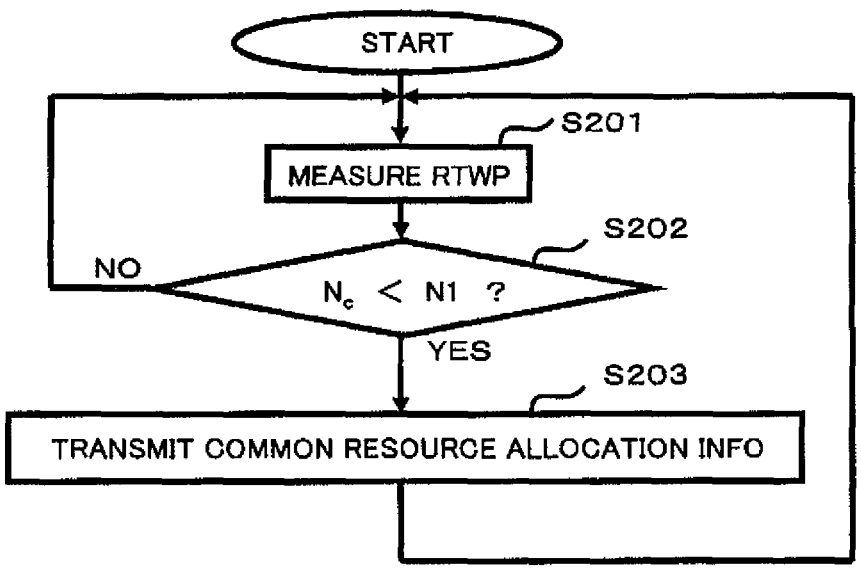
FIG. 9A is a flow chart showing operations for assigning common resource allocation information at a base station.
Figure 9B:
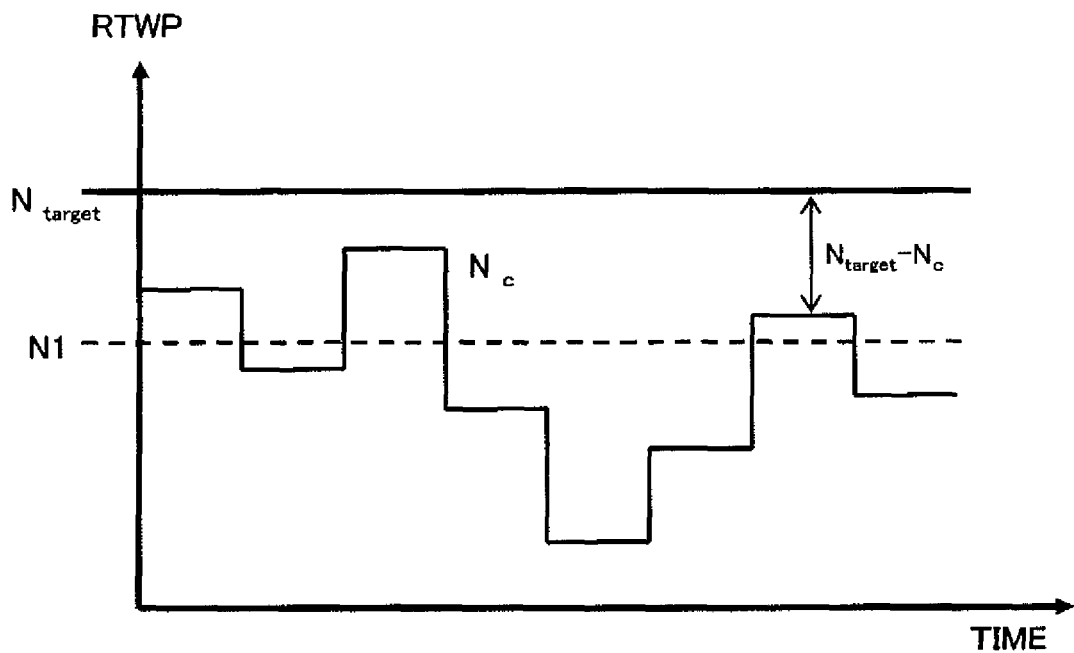
FIG. 9B is a graph schematically showing the variation of a RTWP value Nc as an example, to describe the calculation of the common resource allocation information.

FIG. 9A is a flow chart showing operations for assigning common resource allocation information at a base station, and FIG. 9B is a graph schematically showing the variation of the RTWP value Nc as an example to describe the calculation of the common resource allocation information.

The base station 10 measures current RTWP (Step S201) and compares the measured RTWP value Nc with a threshold value N1 (Step S202). The threshold value N1 is a value determined by assuming the minimum quantity of allocated resource relative to a target RTWP value $N_{target}$. When the measured value Nc is smaller than the threshold value N1 (Step S202: YES), common resource allocation information $R_{common}$ can be calculated in accordance with the following conditional equations as an example (Step S203). Here, the conditional equations are expressed with linear values.

$$R_{dedicated} = \{Tx\_offset\}$$

$$Tx\_offset = Min\left(\frac{k' \times (N_{target} - N_c)}{P_{preamble,rx} \times n_{common}}, Tx\_offset\_max\_d\right)$$
$$= Min\left(\frac{k' \times (N_{target} - N_c)}{N_c \times A \times n_{common}}, Tx\_offset\_max\_d\right)$$

$$\frac{P_{preamble}}{N_c} = A$$

where Tx_offset is an offset value of the transmission power of the RACH message data part to the value of the transmission power of the preamble last transmitted before the receipt of ACK over AICH, $N_{target}$ is a target value of RTWP (a value set by the base station), Nc is a measured value of RTWP (a value measured by the base station), $n_{common}$ is the predicted number of mobile stations that simultaneously perform transmission based on the common resource allocation information (a value set by the base station), Tx_offset_max_c is the maximum quantity of allocated resource per mobile station in the common allocated resource (a value set by the base station), k is the proportion of resource allocated based on the common resource allocation information to the total quantity of allocable resources (a value set by the base station), $P_{preamble,rx}$ is the reception power of the preamble successfully received by the base station, and A is an average value of the ratio between the reception power of a preamble and the measured RTWP value when the preamble is successfully received (a value set by the base station).

At the base station 10, when a preamble is successfully received, it can be assumed that the ratio between the reception power of the preamble and the value of RTWP measured by the base station 10 is a substantially constant value. Accordingly, the base station 10 sets a constant A in advance, and from the constant A and the measured RTWP value Nc, the base station 10 can estimate the reception power $P_{preamble,rx}$ of the preamble every time calculating Tx_offset.

When the measured RTWP value Nc is not smaller than the threshold value N1 (Step S202: NO), the base station 10 does not transmit the common resource allocation information $R_{common}$ to the mobile station 20 in question and returns to Step S201. Regarding this operation, it is also possible that the base station 10 instructs one or more specific mobile stations to perform transmission according to the common resource allocation information, and that only the mobile stations having received the instruction perform transmission according to the common resource allocation information.

1.5) Operation of Mobile Station

FIG. 10 is a flow chart showing operations of a mobile station in the first exemplary embodiment of the present invention. As mentioned earlier, it is assumed that the mobile station 20 retains default profile information received at predetermined time intervals from the base station 10 and also retains common resource allocation information $R_{common}$ received from the base station 10 for the predetermined period Tc.

At the mobile station 20, upon the occurrence of uplink transmission data in the buffer 205 (Step S301), the transmission data control section 204 selects one out of available preamble signatures (PSIGs) and transmits to the base station 10 preamble-part code data including a set of a preamble scrambling code (PSCR) and the selected PSIG (Step S302). Subsequently, upon the receipt of a response ACK over AICH from the base station 10 after a predetermined length of time (Step S303), the mobile station 20 determines its own state of retaining the common resource allocation information $R_{common}$ (Step S304).

In case where the mobile station 20 retains the valid common resource allocation information $R_{common}$, which has not yet used up the predetermined period Tc since it was received (Step S304: YES), the resource allocation information processing section 203 transmits a RACH message part to the base station 10 by using a transmission profile based on the common resource allocation information $R_{common}$ (Step S305) and then carries out a HARQ-supported data transmission process (Step S306). Specifically, the transmission processing section 206 waits to receive a transmission acknowledgment ACK/NACK_HARQ from the base station 10 and, when having received NACK_HARQ, the transmission processing section 206 retransmits the same data to the base station 10 and waits to receive a transmission acknowledgment again. When having received a transmission acknowledgment ACK, or when having received no transmission acknowledgment within a predetermined period, the transmission processing section 206 finishes the HARQ-supported data transmission process.

On the other hand, in case where the mobile station 20 does not retain the valid common resource allocation information $R_{common}$ (Step S304: NO), the resource allocation information processing section 203 transmits a RACH message part to the base station 10 by using the above-mentioned default transmission profile (Step S307).

Subsequently, the presence/absence of remaining transmission data is checked (Step S308). When transmission data remains in the buffer 205 (Step S308: NO), the process goes back to the step of preamble transmission processing (Step S302). When no transmission data remains (Step S308: YES), the mobile station 20 finishes transmission processing.

1.6) Operation of Base Station

Figure 11:
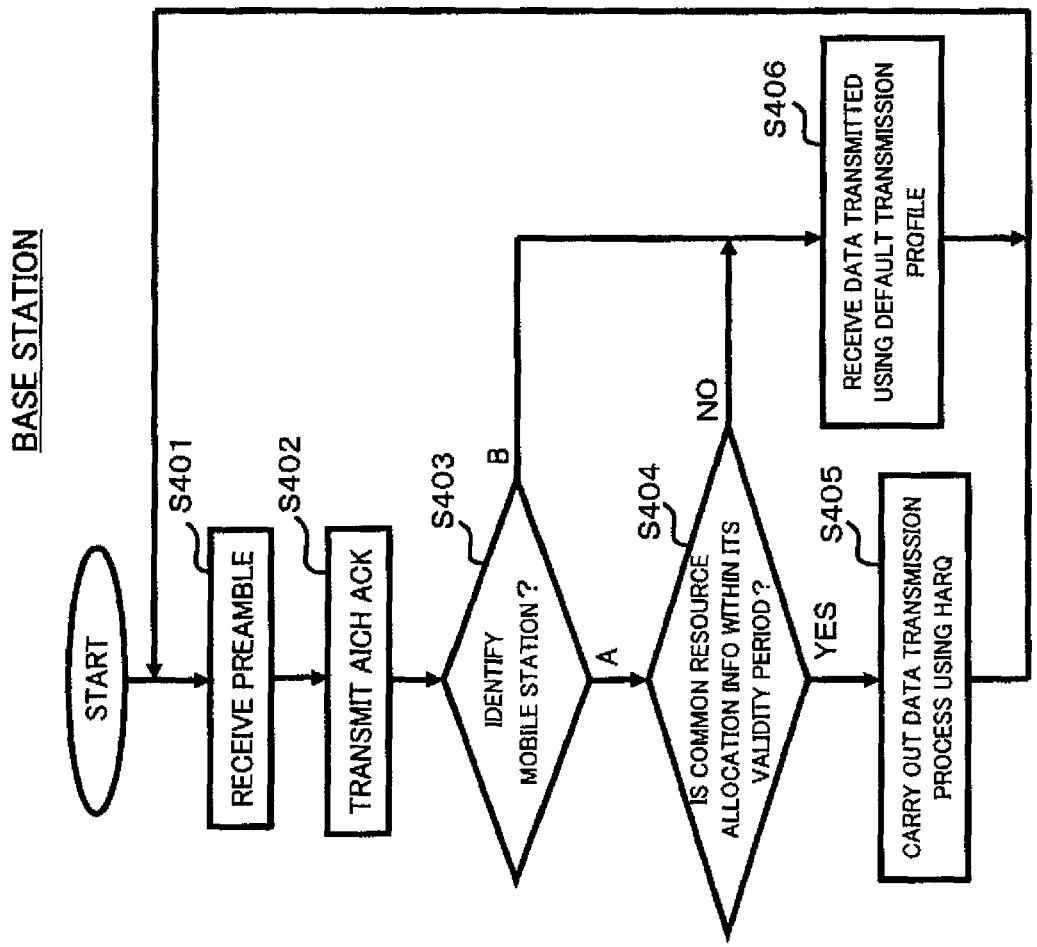
FIG. 11 is a flow chart showing operations of the base station in the first exemplary embodiment of the present invention.

FIG. 11 is a flow chart showing operations of a base station in the first exemplary embodiment of the present invention. As described earlier, it is assumed that default profile information is transmitted from the base station 10 to mobile stations at predetermined time intervals, and that common resource allocation information $R_{common}$ is also transmitted repeatedly at predetermined time intervals.

At the base station 10, upon the complete receipt of a preamble from a mobile station 20 (Step S401), the transmission processing section 106 sends back a response ACK over AICH (Step S402) and further determines the type of the mobile station 20 in question by the received preamble as described earlier (Step S403). For example, it is determined whether or not this mobile station 20 is "a mobile station that receives common resource allocation information and that can execute a HARQ-supported data transmission process." (Hereinafter, the type of such a mobile station will be referred to as "type A," and other types will be collectively referred to as "type B.") Here, when the mobile station 20 is of type A (Step S403: A), the resource allocation control section 109 determines whether or not the common resource allocation information last transmitted is within its validity period (Step S404). If the common resource allocation information last transmitted is within its validity period (Step S404: YES), the base station 10 carries out a HARQ-supported data transmission process (Step S405) and then returns to the step of waiting to receive a preamble (Step S401). When the mobile station 20 is of type B (Step S403: B), or when the common resource allocation information is not within its validity period (Step S404: NO), the base station 10 receives data transmitted by the mobile station 20 using the default transmission profile (Step S406) and then returns to the step of waiting to receive a preamble (Step S401).

Figure 12:
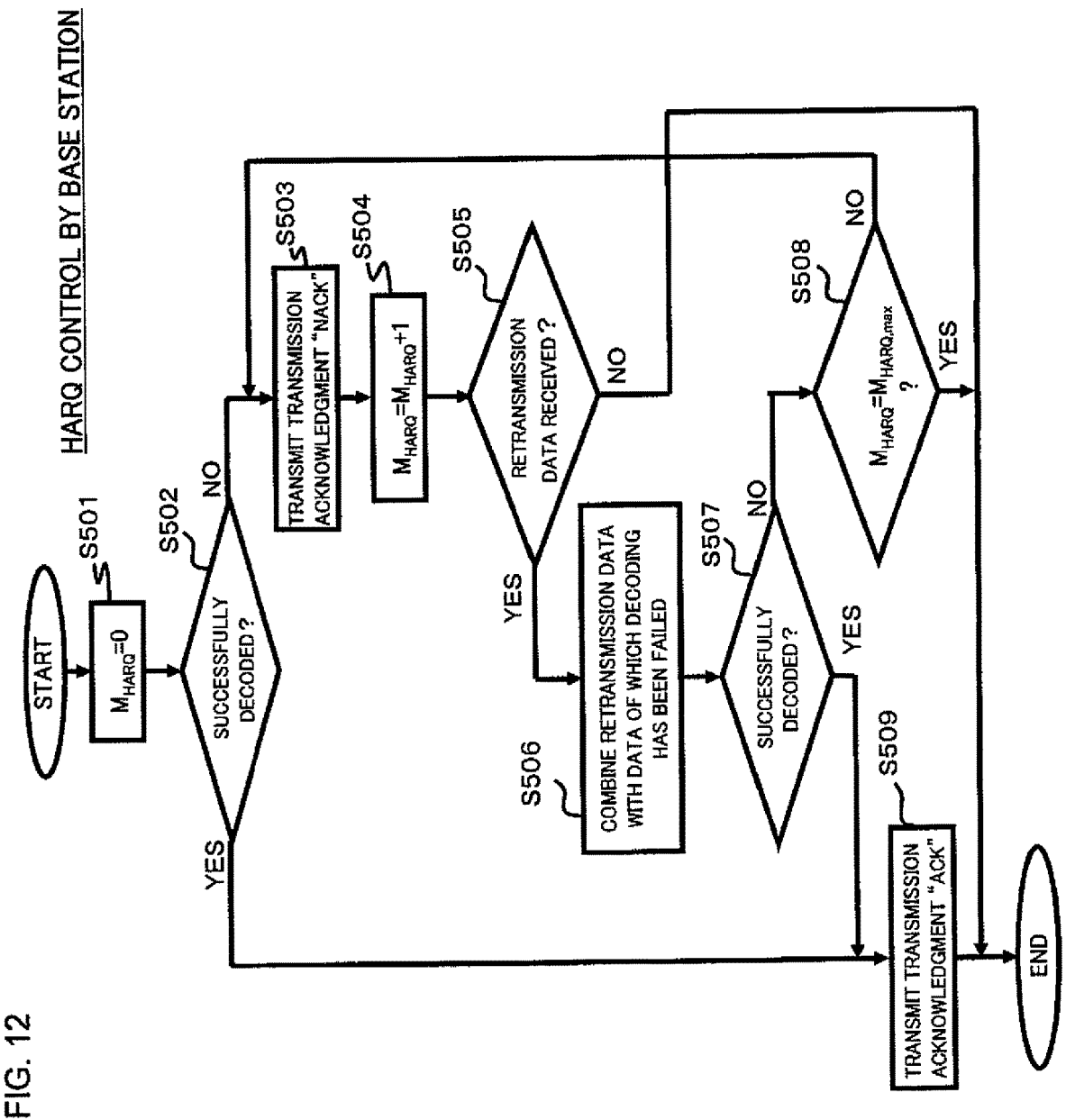
FIG. 12 is a flow chart showing HARQ control by the base station.

FIG. 12 is a flow chart showing HARQ control by a base station. Upon the receipt of a RACH message part, the base station 10 resets a counter $M_{HARQ}$ for a HARQ-supported data transmission process (Step S501) and attempts to decode the data in the received RACH message part (Step S502). When the decoding is done successfully (Step S502: YES), the base station 10 notifies transmission acknowledgment information ACK to the mobile station 20 in question through a downlink common channel (Step S509) and then finishes the HARQ-supported data transmission process.

When the base station 10 has failed decoding (Step S502: NO), the base station 10 notifies transmission acknowledgment information NACK to the mobile station 20 through the downlink common channel (Step 503), increments the counter $M_{HARQ}$ for the HARQ-supported data transmission process by one (Step S504), and then waits to receive retransmission data from the mobile station 20 (Step S505).

When the base station 10 has received retransmission data from the mobile station 20 within a predetermined period (Step S505: YES), the base station 10 combines the retransmission data with the data of which the decoding failed previously (Step S506) and attempts decoding again (Step S507).

When the decoding is done successfully (Step S507: YES), the base station 10 transmits transmission acknowledgment information ACK to the mobile station 20 through the downlink common channel (Step S509) and then finishes the HARQ-supported data transmission process. When the base station 10 has failed decoding (Step S507: NO), the base station 10 compares the counter $M_{HARQ}$ with a preset maximum value $M_{HARQ,max}$, which is the maximum number of times a data transmission process can be performed (Step S508). If the counter value $M_{HARQ}$ has reached the maximum value $M_{HARQ,max}$ (Step S508: YES), the base station 10 finishes the HARQ-supported data transmission process. If the counter value $M_{HARQ}$ has not yet reached the maximum value $M_{HARQ,max}$ (Step S508: NO), the process goes back to Step S503, where the base station 10 transmits transmission acknowledgment information NACK to the mobile station 20. In Step S505, when the base station 10 has not received retransmission data from the mobile station 20 within the predetermined period (Step S505: NO), the base station 10 finishes the HARQ-supported data transmission process.

2. Second Exemplary Embodiment

In the method for allocating uplink common channel resources according to the second exemplary embodiment of the present invention, in case where ACK is a response over AICH to a preamble transmitted from a mobile station, a base station transmits dedicated resource allocation information to the mobile station in accordance with a predetermined condition. The mobile station that has received the dedicated resource allocation information determines a RACH message part transmission profile based on the dedicated resource allocation information. A mobile station that does not receive the dedicated resource allocation information determines a transmission profile based on default profile information. Thereby, RACH message part transmissions from the mobile stations are spread over the default resources and dedicated allocated resources. Thus, uniform loads on and stable quality of the uplink common channel, RACH, can be achieved.

2.1) Data Transmission Based on Dedicated Resource Allocation Information (Dedicated Scheduling)

Figure 13:
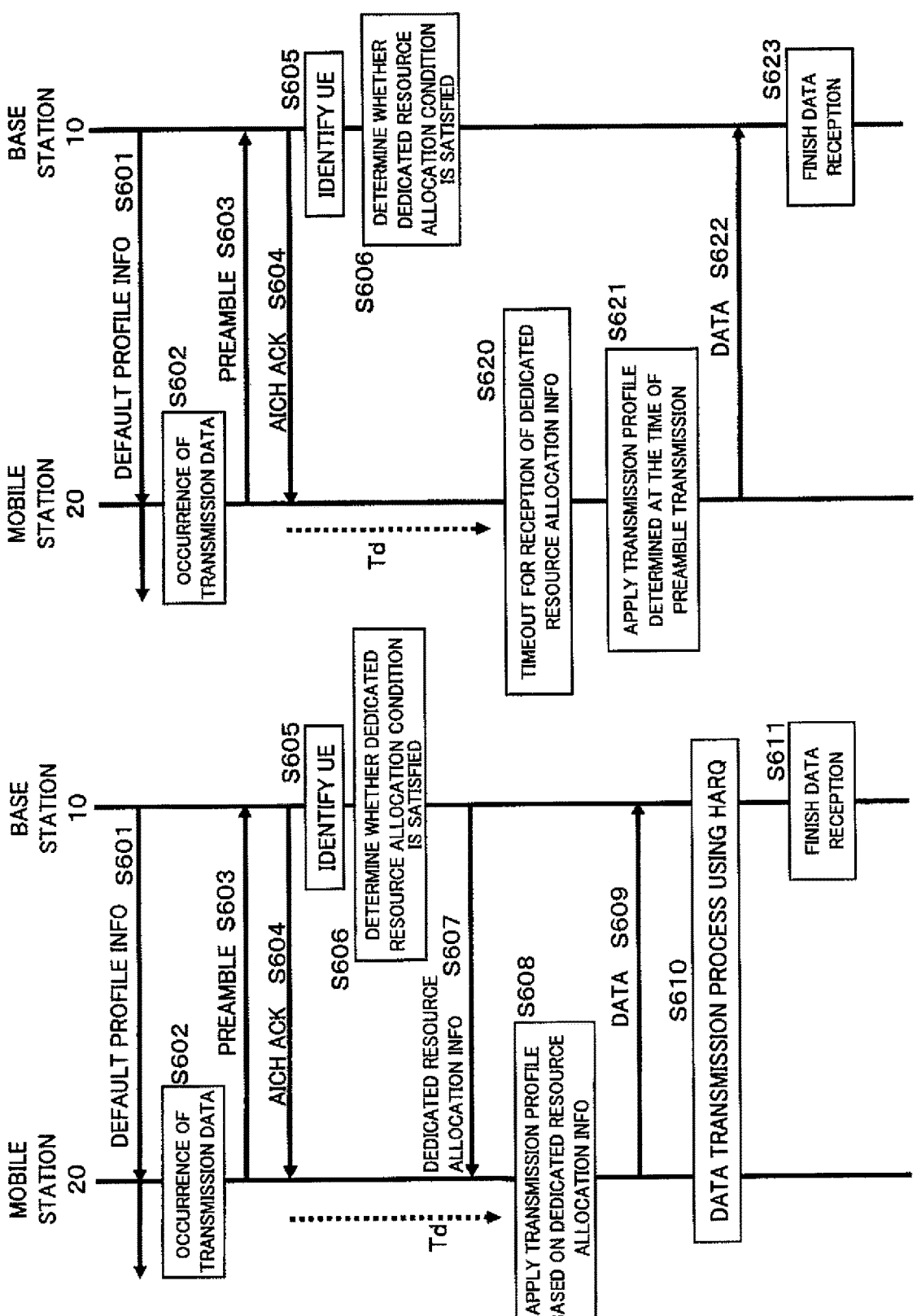
FIG. 13A is a sequence diagram of a data transmission sequence using a transmission profile determined based on dedicated resource allocation information, in the resource allocation method according to the second exemplary embodiment of the present invention.
FIG. 13B is a sequence diagram of a data transmission sequence based on default profile information.

FIG. 13A is a sequence diagram of a data transmission sequence using a transmission profile determined based on dedicated resource allocation information, in the resource allocation method according to the second exemplary embodiment of the present invention. FIG. 13B is a sequence diagram of a data transmission sequence based on default profile information. In each of FIGS. 13A and 13B, a base station 10 transmits default profile information to all mobile stations in its cell at predetermined time intervals (Step S601). Further, the radio quality measurement section 108 of the base station 10 measures RTWP (Nc). This RTWP measurement is repeated at predetermined time intervals.

At a mobile station 20, upon the occurrence of transmission data in the buffer 205 (Step S602), the transmission data control section 204 transmits a preamble to the base station 10 as described earlier (Step S603). The base station 10, upon the receipt of the preamble, transmits a response ACK to the mobile station 20 over AICH (Step S604). At this point in time, the base station 10 identifies the mobile station 20 based on a predetermined criterion as in the first exemplary embodiment (Step S605).

For example, setting can be made as follows. The resource allocation information processing section 203 of the mobile station 20 divides sets of an available preamble signature (PSIG) and a preamble scrambling code (PSCR) into two groups in advance. The mobile station 20, if it is a mobile station that receives dedicated resource allocation information and that can execute a HARQ-supported data transmission process, selects a PSIG-PSRC combination from one of the groups. At the base station 10, when the PSIG-PSRC set of a received preamble is one belonging to the one of the groups, the base station 10 determines that the mobile station 20 in question is "a target for transmission of dedicated resource allocation information and is capable of executing a HARQ-supported data transmission process." On the other hand, if the PSIG-PSRC set of a received preamble is one belonging to the other group, the base station 10 determines that the mobile station 20 in question is a mobile station of another type. The base station 10 further determines whether or not a predetermined dedicated resource allocation condition, which will be described later, is satisfied (Step S606).

Referring to FIG. 13A, if the predetermined dedicated resource allocation condition is satisfied, the base station 10 transmits dedicated resource allocation information $R_{dedicated}$ to the mobile station 20 identified (Step S607). The mobile station 20, in case of having received the dedicated resource allocation information $R_{dedicated}$, calculates a RACH message part transmission profile Tx_Profile based on the dedicated resource allocation information $R_{dedicated}$ (Step S608) and transmits data to the base station 10 by using the transmission profile Tx_Profile (Step S609).

The base station 10, in case of having received the data from the mobile station 20 based on the dedicated resource allocation information $R_{dedicated}$, initiates a HARQ-supported data transmission process (Step S610) and then, if a transmission acknowledgment is ACK, finishes data reception (Step S611). The HARQ-supported data transmission process is as described in the first exemplary embodiment, and therefore the description thereof will be omitted.

Since data transmission is performed based on the dedicated resource allocation information as described above, the quality and liability of data transmission are enhanced. Additionally, by virtue of the HARQ process, still higher liability can be achieved.

2.2) Data Transmission Based on Default Profile Information

Referring to FIG. 13B, in case where the mobile station 20 has not received the dedicated resource allocation information $R_{dedicated}$ within a predetermined period (Td) (Step S620), the mobile station 20 transmits data by using a default transmission profile, which is determined based on the PSTC and PSIG used in the preamble transmission, transmission timing, and default profile information (Step S621, S622). Thereafter, the base station 10 finishes data reception (Step S623).

Figure 14:
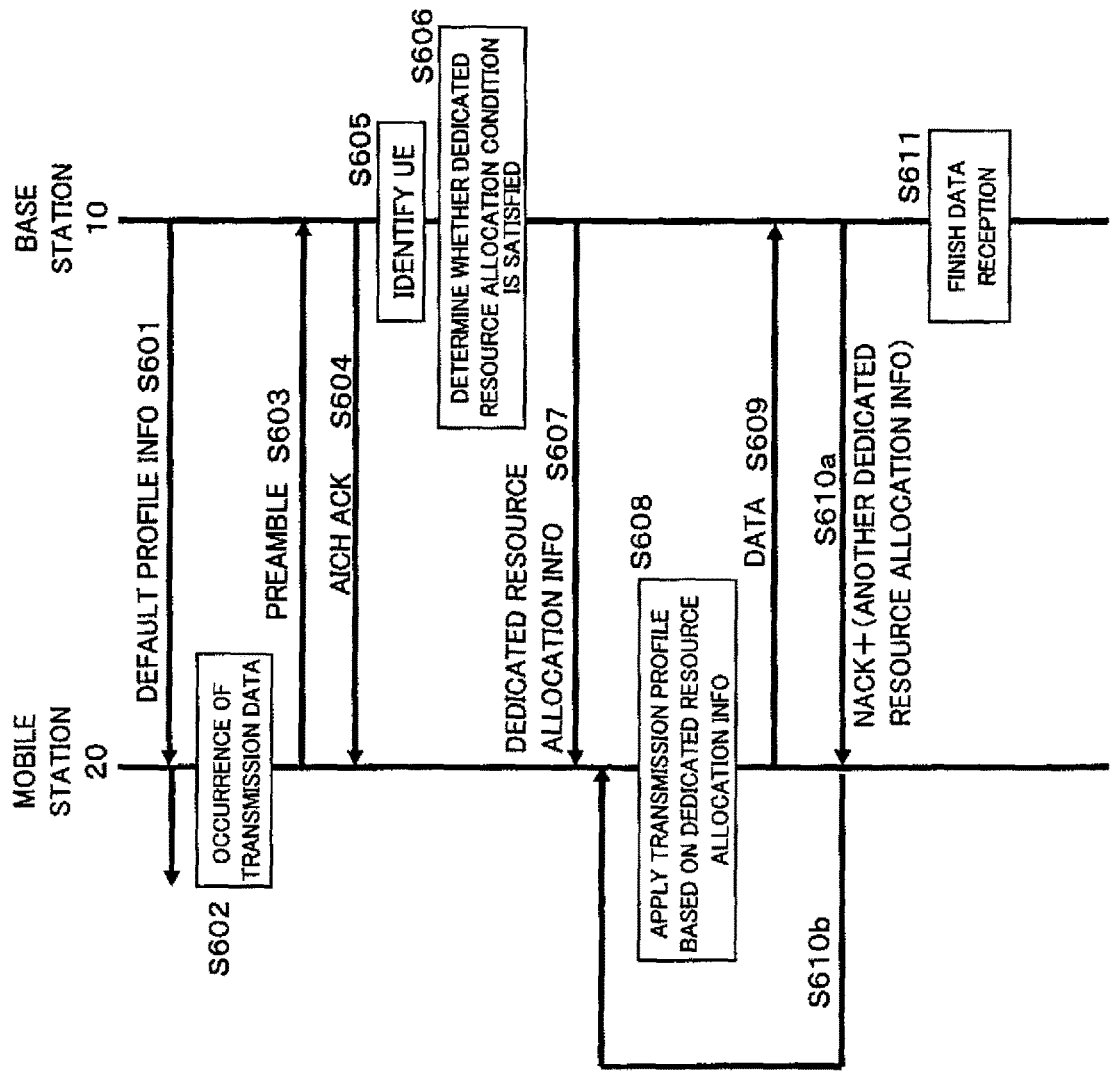
FIG. 14 is a sequence diagram of a data transmission sequence using a transmission profile determined based on dedicated resource allocation information, in a resource allocation method according to a modification example of the second exemplary embodiment of the present invention.

FIG. 14 is a sequence diagram of a data transmission sequence using a transmission profile determined based on dedicated resource allocation information, in the resource allocation method according to the modification example of the second exemplary embodiment of the present invention. The same reference symbols and numerals as in FIG. 13A are given to similar steps to those shown in FIG. 13A, and the description thereof will be omitted. In the modified example shown in FIG. 14, as in the case shown in FIG. 13A, a mobile station 20 that has received dedicated resource allocation information transmits data to the base station 10 by using a transmission profile based on the dedicated resource allocation information (Step S609). However, in the present example, a different sequence follows when the base station 10 has failed to completely receive the data. Specifically, when the base station 10 has failed to completely receive the data with the transmission profile based on the notified dedicated resource allocation information, the base station 10 responds with NACK and, in parallel with this, also transmits another dedicated resource allocation information to the mobile station 20 (Step S610a). The mobile station 20, upon the receipt of this information, retransmits the data by using a transmission profile based on the newly notified dedicated resource allocation information (Steps S608 and S609). However, a limit should be placed on the number of repetitions of this retransmission process.

If the base station 10 can completely receive the data for this retransmission, the base station 10 finishes data reception (Step S611). If the base station 10 cannot completely receive the data even after retransmission has been repeated a predetermined number of times, the mobile station 20 transmits the data by using default transmission profile, which is determined based on the PSTC and PSIG used in the preamble transmission, transmission timing, and default profile information (Step S621 of FIG. 13B).

The base station 10 then finishes data reception (Step S623).

2.3) Transmission Profile

The RACH message part transmission profile Tx_Profile includes the following components:

Tx_Profile=[$\Delta P_{p-m}$,TF_offset,TF_selected]

where $\Delta P_{p-m}$ is an offset value of the transmission power of the RACH message control part to the amount of the transmission power of the preamble last transmitted by the mobile station before the receipt of ACK over AICH, TF_offset is a transmission power offset value corresponding to a data format TF that the mobile station uses when transmitting the RACH message part, and TF_selected is the data format that the mobile station uses when transmitting the RACH message part. The data format TF_selected is determined in such a manner that MAX_TF is compared with the data capacity of the smallest one of TFs that can accommodate Buffer_size and the data format having the smaller capacity is selected as TF_selected (that is, min [MAX_TF, Buffer_size]), where MAX_TF is a maximum data format usable for the dedicated allocated resources which are allocated by the base station (calculated from the dedicated resource allocation information $R_{dedicated}$), and Buffer_size is the amount of data buffered at the mobile station.

2.4) Determination of Dedicated Resource Allocation Information

The above-mentioned predetermined dedicated resource allocation condition (Step S606 in FIG. 13A) can be set as follows for example:

$P > P_{th}$ and $Nc < N1$ where P is the priority of the mobile station identified based on a preamble, $P_{th}$ is a threshold value of mobile station priority (a value set by the base station), Nc is a measured value of RTWP (a value measured by the base station), and N1 is a limit value of the power usable for allocated resource (a value set by the base station).

When this condition is satisfied, the base station 10 determines dedicated resource allocation information $R_{dedicated}$ in accordance with the following equations and transmits it to the mobile station 20.

$$R_{dedicated} = \{Tx\_offset\}$$

$$Tx\_offset = Min\left(\frac{k' \times (N_{target} - N_c)}{P_{preamble,rx} \times n_{common}}, Tx\_offset\_max\_d\right)$$

$$= Min\left(\frac{k' \times (N_{target} - N_c)}{N_c \times A \times n_{common}}, Tx\_offset\_max\_d\right)$$

$$\frac{P_{preamble}}{Nc} = A$$

where Tx_offset is an offset value of the transmission power of the RACH message data part to the value of the transmission power of the preamble last transmitted by the mobile station before the receipt of ACK over AICH, $N_{target}$ is a target value of RTWP (a value set by the base station), $N_{dedicated}$ is the number of mobile stations from which the base station simultaneously receives based on the dedicated resource allocation information (a value measured by the base station), Tx_offset_max_d is the maximum quantity of allocated resources per mobile station in the dedicated allocated resources (a value set by the base station), k' is the proportion of resources allocated based on the dedicated resource allocation information to the total quantity of all allocable resources (a value set by the base station), $P_{preamble,rx}$ is the reception power of the preamble successfully received by the base station, and A is an average value of the ratio between the reception power of a preamble and a measured value of RTWP when the preamble is successfully received (a value set by the base station).

The preamble reception power $P_{preamble,rx}$ is calculated by the same method as in the first exemplary embodiment, and therefore the description thereof will be omitted. $N_{dedicated}$ represents the number of mobile stations to be controlled based on the dedicated resource allocation information, among the mobile stations whose preambles have been received by the base station within a predetermined period.

2.4) Operation of Mobile Station

Figure 15:
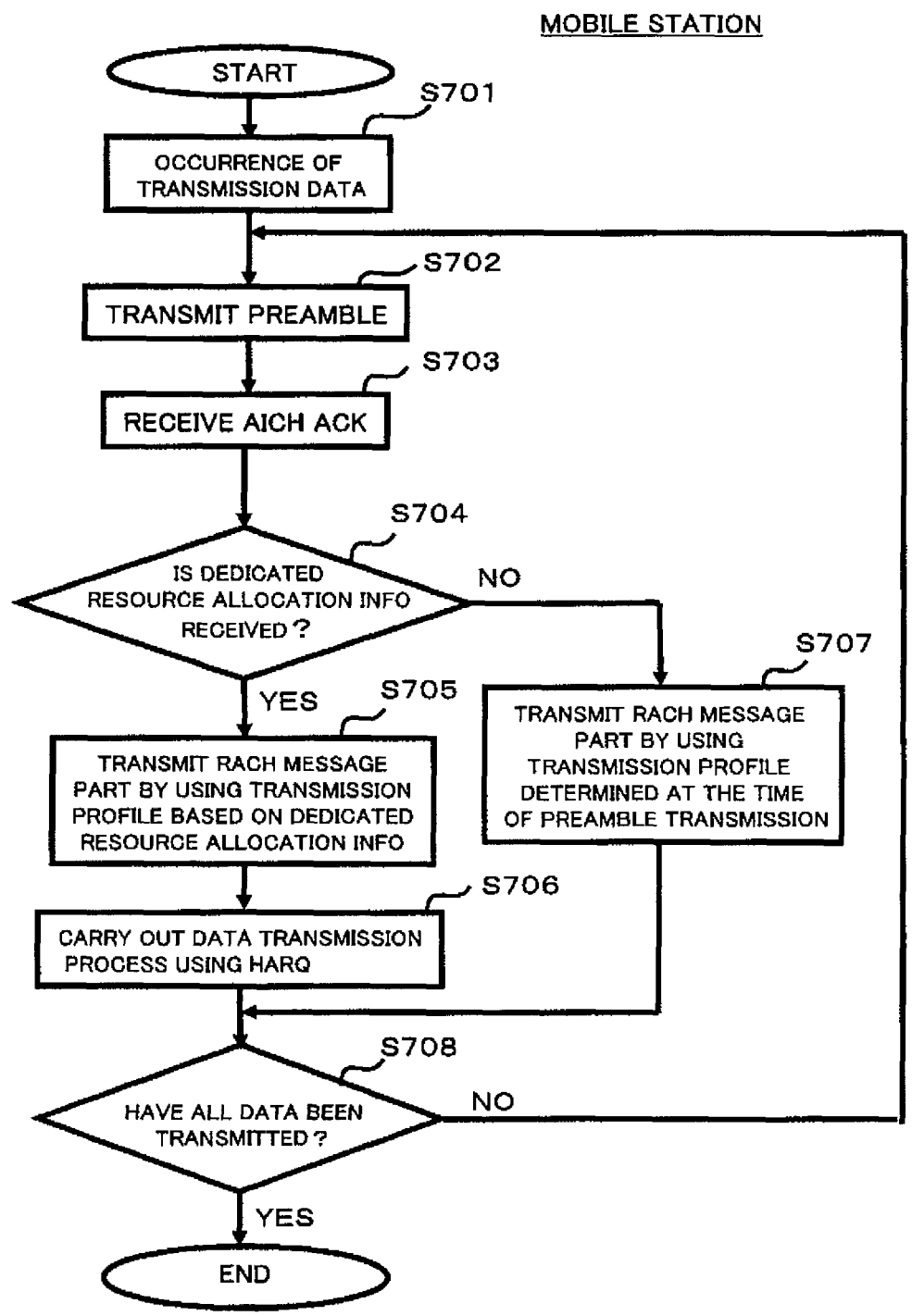
FIG. 15 is a flow chart showing operations of the mobile station in the second exemplary embodiment of the present invention.

FIG. 15 is a flow chart showing operations of a mobile station in the second exemplary embodiment of the present invention. First, at the mobile station 20, upon the occurrence of transmission data in the buffer 205 (Step S701), the transmission data control section 204 selects one out of available preamble signatures (PSIGs) and transmits to the base station 10 preamble-part code data including a set of the selected PSIG and a preamble scrambling code (PSCR) (Step S702). Subsequently, upon the receipt of a response ACK over AICH from the base station 10 after a predetermined length of time (Step S703), the mobile station 20 determines whether or not it receives dedicated resource allocation information $R_{dedicated}$ within the predetermined period Td (Step S704).

When the dedicated resource allocation information $R_{dedicated}$ is received within the predetermined period Td (Step S704: YES), the resource allocation information processing section 203 transmits a RACH message part to the base station 10 by using a transmission profile based on the dedicated resource allocation information $R_{dedicated}$ (Step S705) and carries out a HARQ-supported data transmission process (Step S706). Specifically, the transmission processing section 206 waits to receive a transmission acknowledgment ACK/NACK_HARQ from the base station 10. In case of having received NACK_HARQ, the mobile station 20 retransmits the same data to the base station 10 and waits to receive a transmission acknowledgment again. When the mobile station 20 has received a transmission acknowledgment ACK, or when the mobile station 20 has received no transmission acknowledgment within a predetermined period, the mobile station 20 finishes the HARQ-supported data transmission process.

On the other hand, when the dedicated resource allocation information $R_{dedicated}$ is not received (Step S704: NO), the resource allocation information processing section 203 transmits a RACH message part to the base station 10 by using the above-described default transmission profile (Step S707).

Subsequently, the presence/absence of remaining transmission data is checked (Step S708). When transmission data remains in the buffer 205 (Step S708: NO), the process goes back to the step of preamble transmission processing (Step S702). When no transmission data remains (Step S708: YES), the mobile station 20 finishes transmission processing.

2.5) Operation of Base Station

Figure 16:
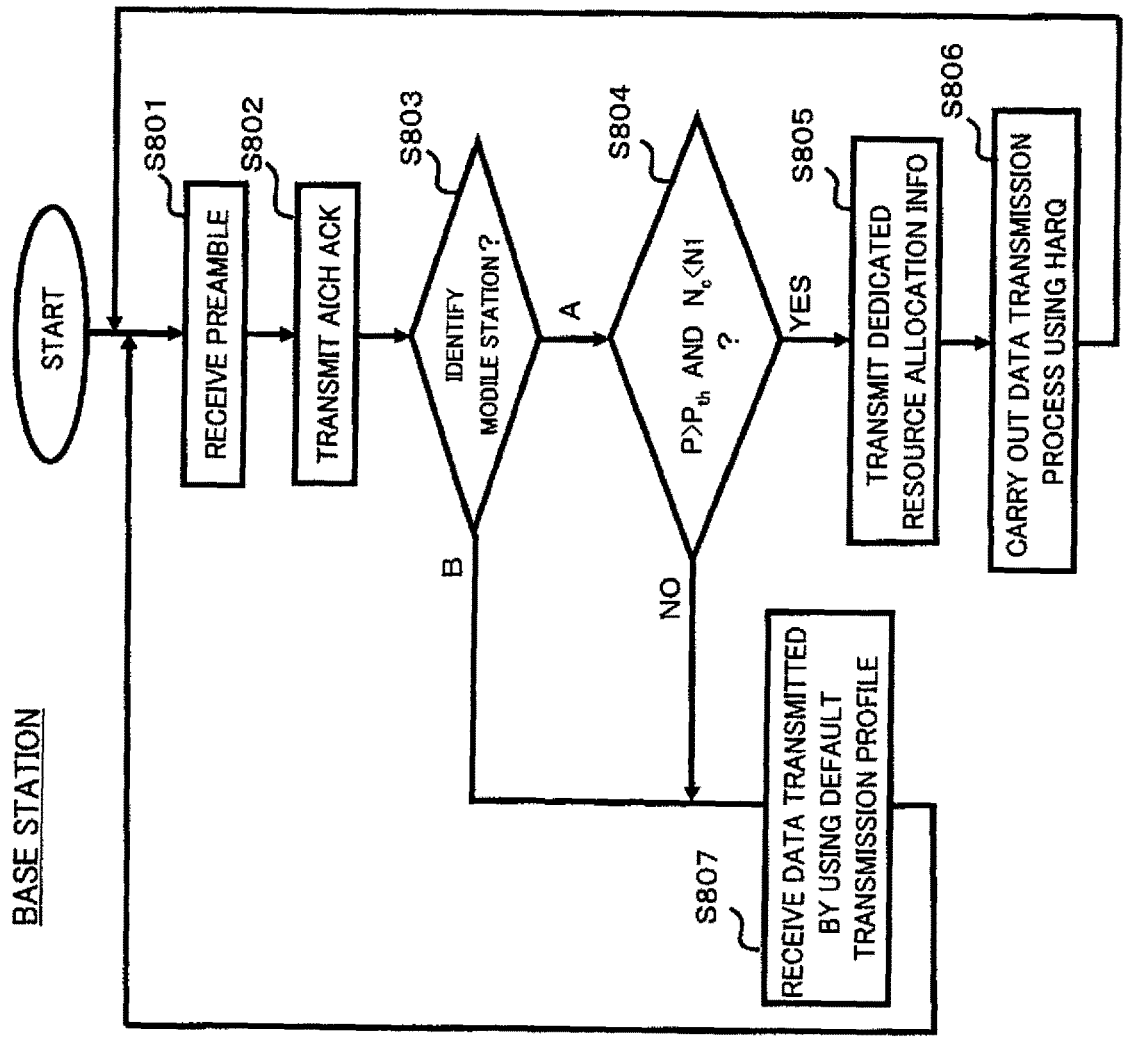
FIG. 16 is a flow chart showing operations of the base station in the second exemplary embodiment of the present invention.

FIG. 16 is a flow chart showing operations of a base station in the second exemplary embodiment of the present invention. As described above, it is assumed that default profile information is transmitted from the base station 10 to mobile stations at predetermined time intervals.

At the base station 10, upon the complete receipt of a preamble from a mobile station 20 (Step S801), the transmission processing section 106 sends back a response ACK over AICH (Step S802) and determines the type of the mobile station 20 in question by the received preamble as described above (Step S803). For example, it is determined whether or not the mobile station 20 is "a target for transmission of dedicated resource allocation information and is capable of executing a HARQ-supported data transmission process." (Hereinafter, the type of such a mobile station will be referred to as "type A," and other types will be collectively referred to as "type B.") Here, if this mobile station 20 is of type A (Step S803: A), the resource allocation control section 109 determines whether or not the above-described predetermined dedicated resource allocation condition ($P>P_{th}$ and $Nc<N1$) is satisfied (Step S804).

When the dedicated resource allocation condition is satisfied (Step S804: YES), the base station 10 generates dedicated resource allocation information $R_{dedicated}$ as described above and transmits it to the mobile station 20 of type A (Step S805). The base station 10 then carries out a HARQ-supported data transmission process using a transmission profile based on the dedicated resource allocation information $R_{dedicated}$ and, after having received data completely (Step S806), returns to the step of waiting to receive a preamble (Step S801). In case where the dedicated resource allocation condition is not satisfied (Step S804: NO), or where the mobile station 20 is of type B (Step S803: B), the base station 10 receives data transmitted by the mobile station 20 using the default transmission profile as described above (Step S807) and then returns to the step of waiting to receive a preamble (Step S801). The HARQ-supported data transmission process is as described already with reference to FIG. 12 and others, and therefore the detailed description thereof will be omitted.

3. Third Exemplary Embodiment

In a method for allocating uplink common channel resources according to a third exemplary embodiment of the present invention, when ACK is a response over AICH to a preamble transmitted from a mobile station, the mobile station transmits data by using an ordinary default transmission profile. However, even in case where NACK is a response, a base station transmits dedicated resource allocation information to the mobile station in accordance with a predetermined condition, and the mobile station that has received the dedicated resource allocation information determines a RACH message part transmission profile based on the dedicated resource allocation information. Thereby, RACH message part transmissions from mobile stations are spread over the default resources and the dedicated allocated resources. Thus, uniform loads on and stable quality of the uplink common channel, RACH, can be achieved.

3.1) Data Transmission Based on Dedicated Resource Allocation Information

Figure 17:
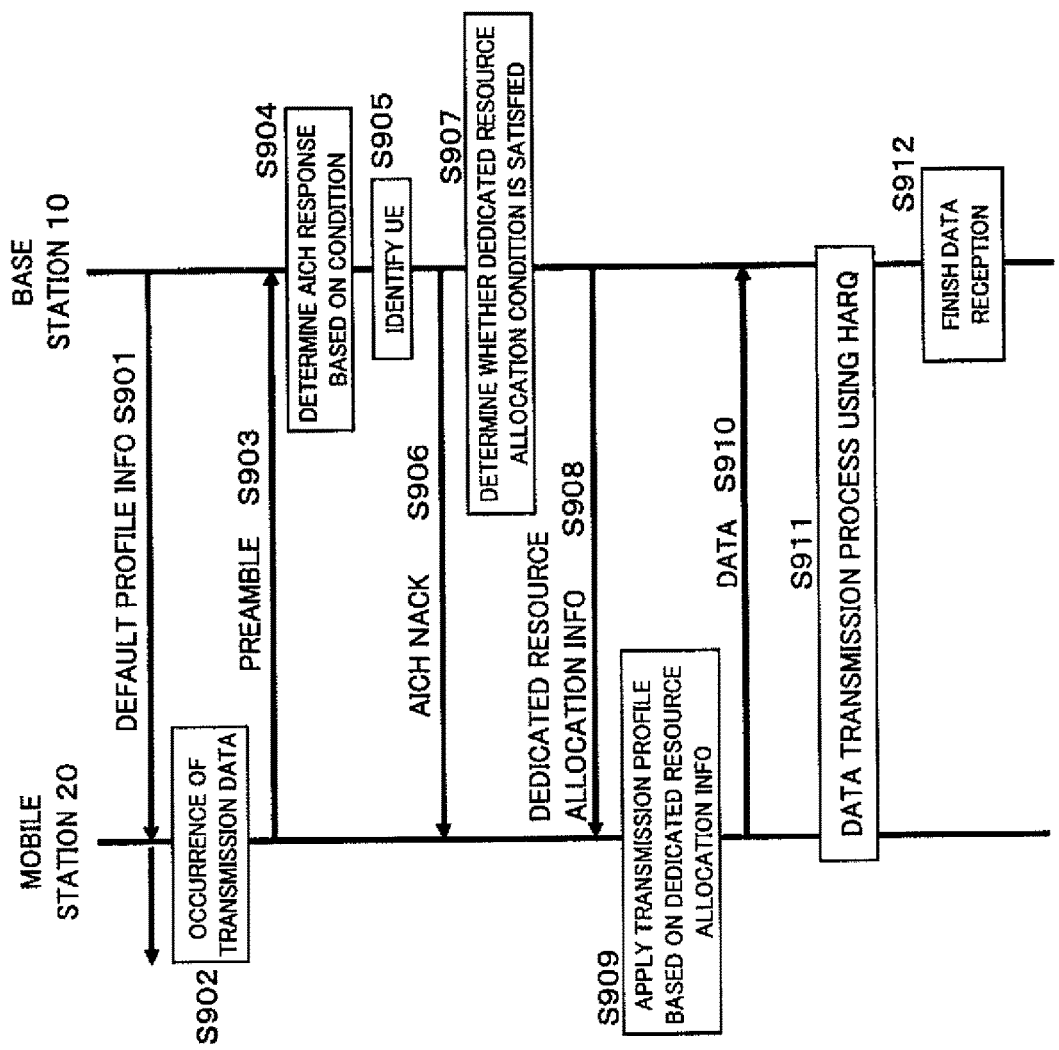
FIG. 17 is a sequence diagram of a data transmission sequence using a transmission profile determined based on dedicated resource allocation information, in a resource allocation method according to a third exemplary embodiment of the present invention.

FIG. 17 is a sequence diagram of a data transmission sequence using a transmission profile determined based on dedicated resource allocation information, in the resource allocation method according to the third exemplary embodiment of the present invention. A base station 10 transmits default profile information to all mobile stations in its cell at predetermined time intervals (Step S901). Further, the radio quality measurement section 108 of the base station 10 measures RTWP (Nc). This RTWP measurement is repeated at predetermined time intervals.

At a mobile station 20, upon the occurrence of transmission data in the buffer 205 (Step S902), the transmission data control section 204 transmits a preamble to the base station 10 as described earlier (Step S903). Since each mobile station transmits preamble-part code data by using a preamble signature that the mobile station has randomly selected as described already, there is a possibility that different mobile stations select the same preamble signature.

The base station 10 determines whether or not it has received the same PSIG and PSRC as those of the mobile station 20 from a different mobile station within a predetermined period (Step S904) and, if it has, identifies the mobile station 20 (as well as the different mobile station) based on a predetermined criterion as in the first exemplary embodiment (Step S905). The base station 10 transmits a response NACK over AICH to these mobile stations that have transmitted the same preambles (Step S906).

For example, setting can be made as follows. The resource allocation information processing section 203 of the mobile station 20 divides sets of an available PSIG and a PSCR into two groups in advance. Then, the mobile station 20 selects a PSIG-PSCR combination from one of the groups if it is a mobile station that receives dedicated resource allocation information and that can execute a HARQ-supported data transmission process. At the base station 10, if the PSIG-PSCR set of a received preamble is one belonging to the one of the groups, the base station 10 determines that the mobile station in question is "a target for transmission of dedicated resource allocation information and is capable of executing a HARQ-supported data transmission process." On the other hand, if the PSIG-PSCR set of a received preamble is one belonging to the other group, the base station 10 determines that the mobile station in question is of another type.

The base station 10 further determines, for the mobile station 20, whether or not a predetermined dedicated resource allocation condition, which will be described later, is satisfied (Step S907). When the predetermined dedicated resource allocation condition is satisfied, the base station 10 transmits dedicated resource allocation information $R_{dedicated}$ to the mobile station 20, which the base station 10 has identified and has transmitted NACK to (Step S908). The mobile station 20 in question, upon the receipt of the dedicated resource allocation information $R_{dedicated}$, calculates a RACH message part transmission profile Tx_Profile based on the dedicated resource allocation information $R_{dedicated}$ (Step S909) and transmits data to the base station 10 by using the transmission profile Tx_Profile (Step S910).

When the base station 10 has received the data from the mobile station 20 based on the dedicated resource allocation information $R_{dedicated}$, the base station 10 initiates a HARQ-supported data transmission process (Step S911). Then, if a transmission acknowledgment is ACK, the base station 10 finishes data reception (Step S912). The HARQ-supported data transmission process is as described in the first exemplary embodiment, and therefore the description thereof will be omitted.

3.2) Retransmission of Preamble

Figure 18:
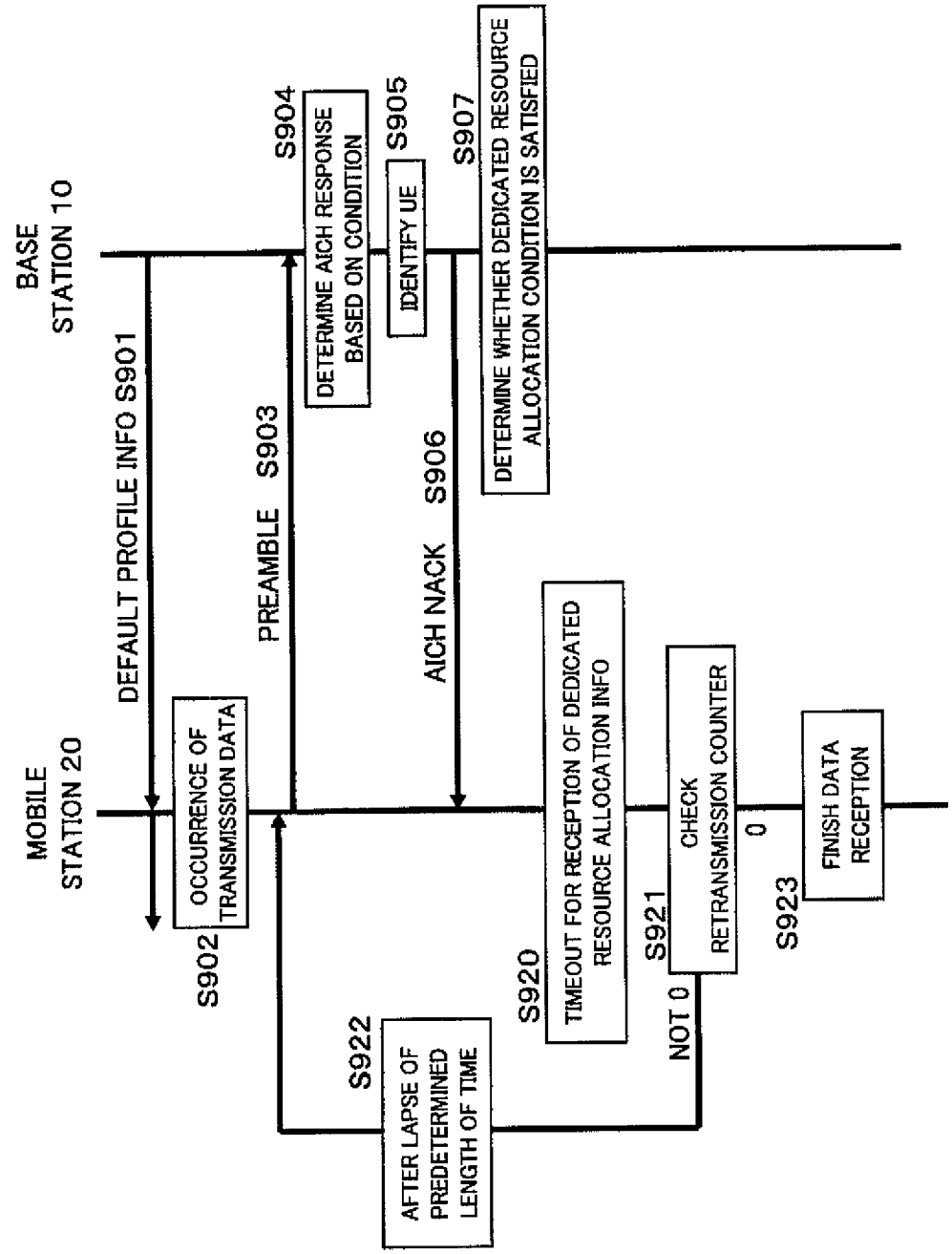
FIG. 18 is a sequence diagram showing a preamble retransmission procedure in case where a response over AICH is NACK, in the resource allocation method according to the third exemplary embodiment of the present invention.

FIG. 18 is a sequence diagram showing a preamble retransmission procedure in case where a response over AICH is NACK, in the resource allocation method according to the third exemplary embodiment of the present invention. The same reference symbols and numerals as in FIG. 17 are given to similar steps to those of the sequence in FIG. 17, and the description thereof will be omitted.

Referring to FIG. 18, when the base station 10 determines in Step S907 that the predetermined dedicated resource allocation condition is not satisfied, the base station 10 does not transmit dedicated resource allocation information $R_{dedicated}$. In this case, since the mobile station 20 does not receive dedicated resource allocation information $R_{dedicated}$ within a predetermined period Td (Step S920), the mobile station 20 checks a retransmission counter (Step S921) and, unless the retransmission counter shows 0, retransmits a preamble after a lapse of a predetermined length of time (Steps S922 and S903). The mobile station 20 then decrements the retransmission counter by one. When the retransmission counter has reached 0 without receiving a response ACK over AICH, the mobile station 20 terminates data transmission (Step S923).

Figure 19:
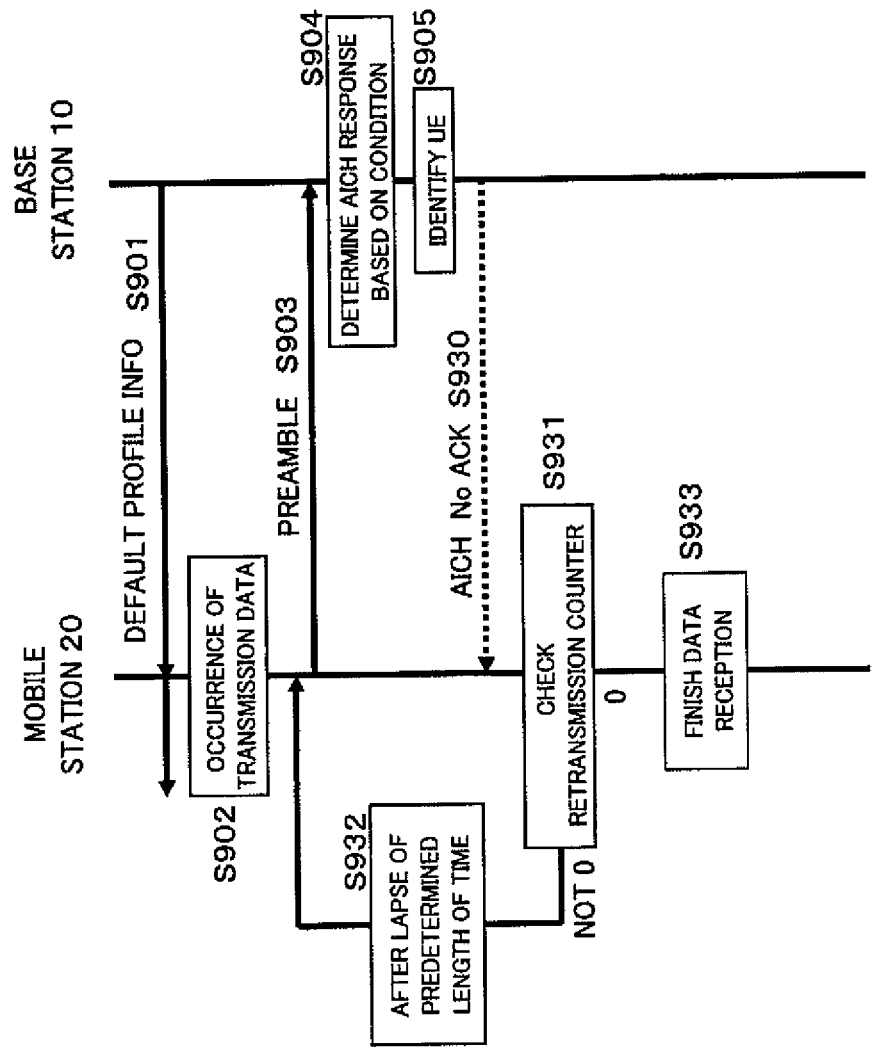
FIG. 19 is a sequence diagram showing a preamble retransmission procedure in case where no ACK is transmitted over AICH, in the resource allocation method according to the third exemplary embodiment of the present invention.

FIG. 19 is a sequence diagram showing a preamble retransmission procedure in case where no ACK is transmitted over AICH, in the resource allocation method according to the third exemplary embodiment of the present invention. The same reference symbols and numerals as in FIG. 18 are given to similar steps to those of the sequence in FIG. 18, and the description thereof will be omitted. In the present case, since the mobile station 20 does not receive any response over AICH, the mobile station 20 checks a retransmission counter (Step S931) and, unless the retransmission counter shows 0, retransmits a preamble after a lapse of a predetermined length of time (Steps S932 and S903) and decrements the retransmission counter by one. When the retransmission counter has reached 0 without receiving a response ACK over AICH, the mobile station 20 terminates data transmission (Step S933).

Figure 20:
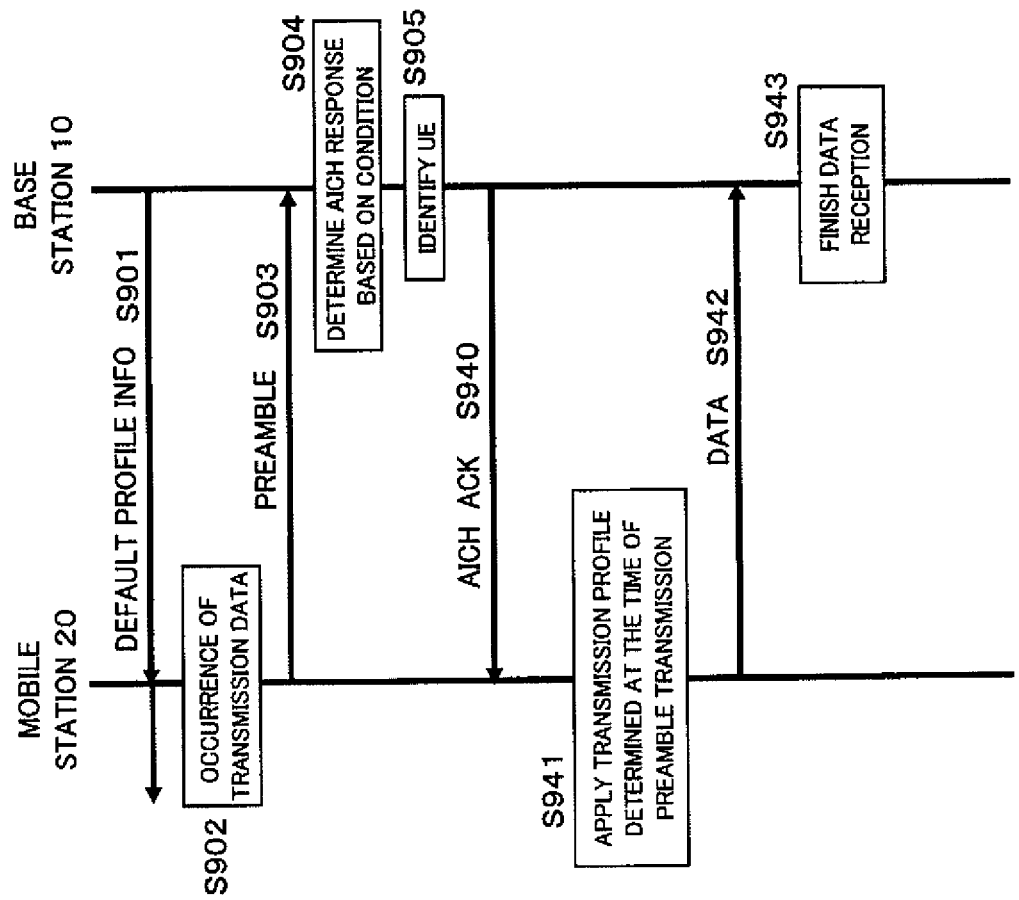
FIG. 20 is a sequence diagram showing a data transmission procedure in case where a response over AICH is ACK, in the resource allocation method according to the third exemplary embodiment of the present invention.

FIG. 20 is a sequence diagram showing a data transmission procedure in case where a response over AICH is ACK, in the resource allocation method according to the third exemplary embodiment of the present invention. The same reference symbols and numerals as in FIG. 18 or 19 are given to similar steps to those of the sequence in FIG. 18 or 19, and the description thereof will be omitted. When the mobile station 20 has received a response ACK over AICH after the transmission of a preamble (Step S940), the mobile station 20 transmits a RACH message part by using a transmission profile determined by the PSRC and PSIG used in the preamble transmission, transmission timing, and default profile information. Accordingly, when the mobile station 20 has received a response ACK over AICH after the retransmission of a preamble, the mobile station 20 transmits a RACH message part by using a transmission profile based on the default profile information.

3.3) Transmission Profile

The RACH message part transmission profile Tx_Profile includes the following components:

Tx_Profile=[$\Delta P_{p-m}$,TF_offset,TF_selected,ScramblingCode,Tx_timing, ChannelizationCode]

where $\Delta P_{p-m}$ is an offset value of the transmission power of the RACH message control part to the amount of the transmission power of the preamble last transmitted by the mobile station before the receipt of ACK over AICH, TF_offset is a transmission power offset value corresponding to a data format TF that the mobile station uses when transmitting the RACH message part, TF_selected is a data format that the mobile station uses when transmitting the RACH message part, Tx_Profile is a transmission profile for the RACH message part, MAX_TF is a maximum data format usable for the dedicated allocated resources which are allocated by the base station (calculated from the dedicated resource allocation information $R_{dedicated}$), Buffer_size is the amount of data buffered at the mobile station, ScramblingCode is a scrambling code for the RACH message part, Tx_Timing is the timing of transmitting the RACH message part, and ChannelizationCode is a channelization code for the RACH message part.

Note that TF_selected is determined by the same method as in the second exemplary embodiment, and therefore the description thereof will be omitted. Moreover, to obtain ScramblingCode, Tx_Timing, and ChannelizationCode, the dedicated resource allocation information $R_{dedicated}$ is referred to.

3.4) Determination of Dedicated Resource Allocation Information

The determination as to whether or not the dedicated resource allocation condition is satisfied is performed as in the second exemplary embodiment, and therefore the description thereof will be omitted. When the dedicated resource allocation condition is satisfied, the dedicated resource allocation information $R_{dedicated}$ is determined in accordance with the following equation and then transmitted to the mobile station 20 in question.

$$R_{dedicated}=\{Tx\_offset, ScramblingCode, Tx\_Timing, ChannelizationCode\}$$

However, for ScramblingCode, Tx_Timing, and ChannelizationCode, the base station 10 allocates resource that is not used by the different mobile station, in the dedicated resource allocation information $R_{dedicated}$. Tx_offset included in the dedicated resource allocation information $R_{dedicated}$ is calculated by the same method as in the second exemplary embodiment, and therefore the description thereof will be omitted.

3.5) Operation of Mobile Station

Figure 21:
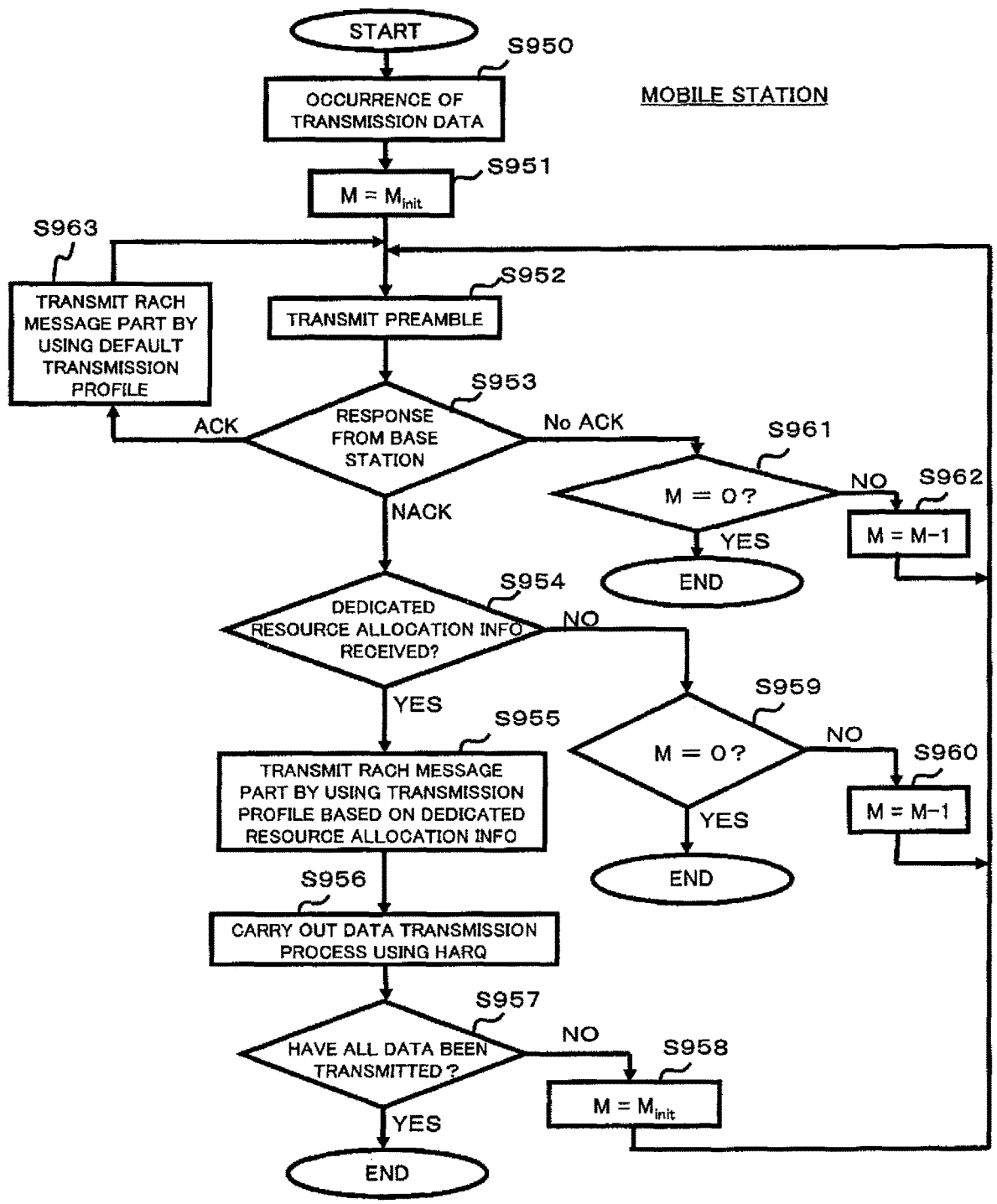
FIG. 21 is a flow chart showing operations of the mobile station in the third exemplary embodiment of the present invention.

FIG. 21 is a flow chart showing operations of a mobile station in the third exemplary embodiment of the present invention. First, at the mobile station 20, upon the occurrence of uplink transmission data in the buffer 205 (Step S950), the transmission data control section 204 initializes a retransmission counter M (Step S951), selects one out of available PSIGs, and transmits preamble-part code data including a set of a PSCR and the selected PSIG to the base station 10 (Step S952). Subsequently, when the mobile station 20 has received a response NACK over AICH from the base station 10 after a predetermined length of time (Step S953), the mobile station 20 determines whether or not it receives dedicated resource allocation information $R_{dedicated}$ within the predetermined period Td (Step S954).

In case of having received the dedicated resource allocation information $R_{dedicated}$ within the predetermine period Td (Step S954: YES), the resource allocation information processing section 203 transmits data to the base station 10 by using a transmission profile Tx_Profile determined based on the dedicated resource allocation information $R_{dedicated}$ (Step S955) and carries out a HARQ-supported data transmission process (Step S956). Specifically, the transmission processing section 206 waits to receive a transmission acknowledgment ACK/NACK_HARQ from the base station 10. When NACK_HARQ is received, the mobile station 20 retransmits the same data to the base station 10 and waits to receive a transmission acknowledgment again. When ACK is received, or when no transmission acknowledgment is received within a predetermined period, the mobile station 20 finishes the HARQ-supported data transmission process.

Subsequently, the presence/absence of remaining transmission data is checked (Step S957). If transmission data remains in the buffer 205 (Step S957: NO), the transmission data control section 204 initializes the retransmission counter M (Step S958), and the process goes back to the step of preamble transmission processing (Step S952). When no transmission data remains (Step S957: YES), the mobile station 20 finishes transmission processing.

On the other hand, in case where the mobile station 20 does not receive the dedicated resource allocation information $R_{dedicated}$ even after the predetermined period Td has passed (Step S954: NO), the resource allocation information processing section 203 determines whether or not the retransmission counter M shows 0 (Step S959). When the retransmission counter M does not show 0 (Step S959: NO), the retransmission counter M is decremented by one (Step S960), and the process goes back to the step of preamble transmission processing (Step S952). If the retransmission counter M shows 0 (Step S959: YES), the mobile station 20 finishes transmission processing.

Moreover, in case where no response over AICH is transmitted from the base station 10 even after the predetermined length of time has passed since the preamble transmission (Step S953: No Ack), the resource allocation information processing section 203 determines whether or not the retransmission counter M shows 0 (Step S961). When the retransmission counter M does not show 0 (Step S961: NO), the retransmission counter M is decremented by one (Step S962), and the process goes back to the step of preamble transmission processing (Step S952). If the retransmission counter M shows 0 (Step S961: YES), the mobile station 20 finishes transmission processing.

In case where a transmission acknowledgment ACK is received over AICH from the base station 10 after the predetermined length of time has passed since the preamble transmission (Step S953: ACK), the mobile station 20 transmits data by using a default transmission profile determined based on the PSRC and PSIG used in the preamble transmission, transmission timing, and default profile information (Step S963), and then returns to the step of preamble transmission processing (Step S952).

3.6) Operation of Base Station

Figure 22:
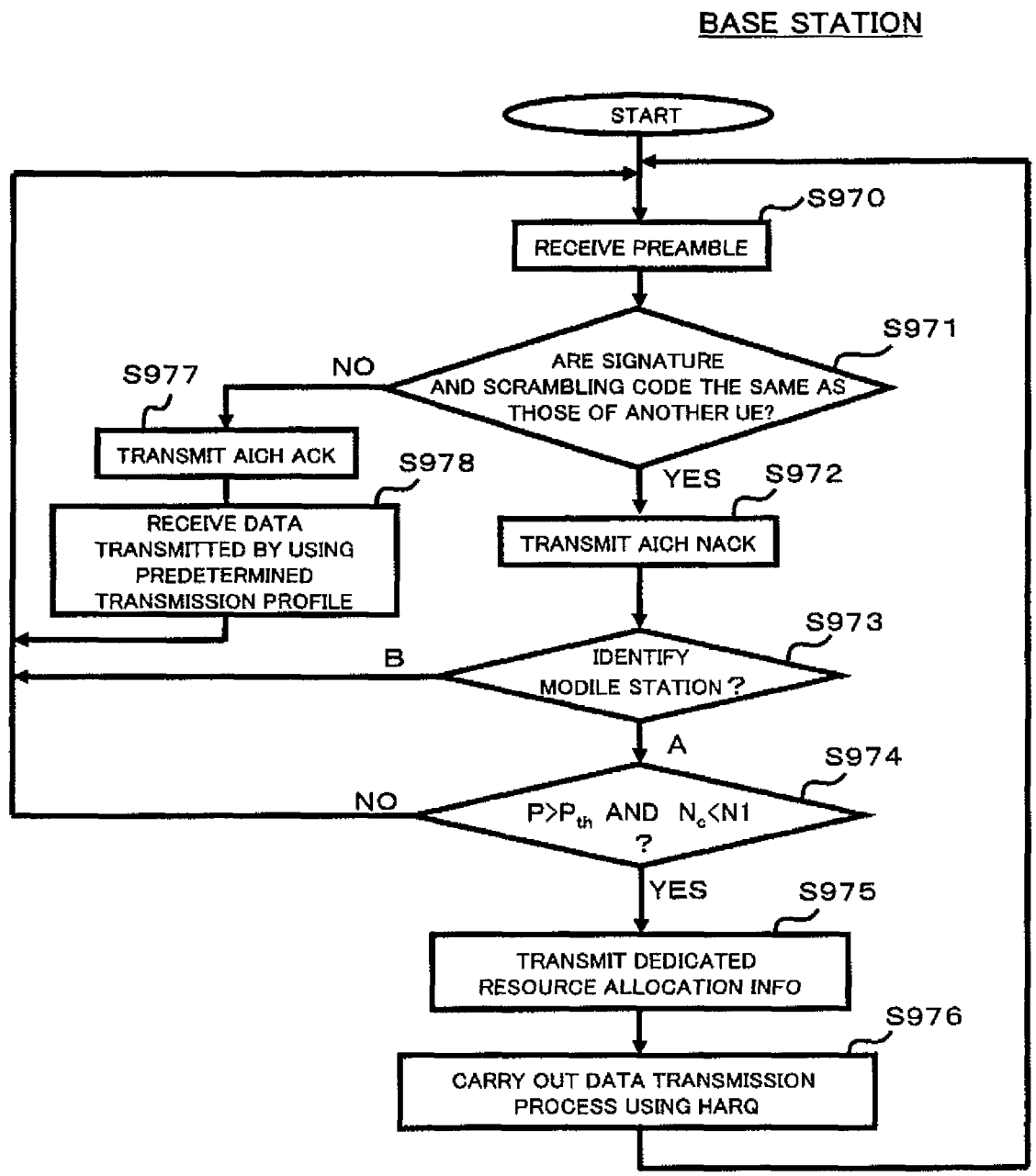
FIG. 22 is a flow chart showing operations of the base station in the third exemplary embodiment of the present invention.

FIG. 22 is a flow chart showing operations of a base station in the third exemplary embodiment of the present invention. It is assumed that default profile information is transmitted from the base station 10 to mobile stations at predetermine intervals, as described above.

When the base station 10 has received a preamble from a mobile station 20 (Step S970), the resource allocation control section 109 of the base station 10 determines whether or not the PSIG and PSRC of the received preamble are the same as those of a preamble from another mobile station received within a predetermined period (Step S971). When these PSIGs and PSRCs are the same (Step S971: YES), the resource allocation control section 109 controls the transmission processing section 106 to transmit a response NACK over AICH to the mobile station 20 (Step S972).

Moreover, as described above, the resource allocation control section 109 determines the type of the mobile station 20 by the preamble received (Step S973). For example, it is determined whether or not the mobile station 20 in question is "a mobile station that is a target for transmission of dedicated resource allocation information and that is capable of executing a HARQ-supported data transmission process." (Hereinafter, the type of such a mobile station will be referred to as "type A," and other types will be collectively referred to as "type B.") Here, if the mobile station 20 is of type A (Step S973: A), the resource allocation control section 109 further determines whether or not the above-described predetermined dedicated resource allocation condition ($P > P_{th}$ and Nc<N1) is satisfied (Step S974).

When the dedicated resource allocation condition is satisfied (Step S974: YES), the base station 10, as described above, generates dedicated resource allocation information $R_{dedicated}$ indicating resources that are not used by the another mobile station (Step S975), and carries out a HARQ-supported data transmission process using a transmission profile based on the dedicated resource allocation information $R_{dedicated}$ (Step S976). Then, after data has been completely received, the process goes back to the step of waiting to receive a preamble (Step S970). In case where the dedicated resource allocation condition is not satisfied (Step S974: NO), or where the mobile station 20 is of type B (Step S973: B), the process goes back to the step of waiting to receive a preamble (Step S970).

In addition, when the preamble from the mobile station 20 in question and the preamble from the another mobile station received within the predetermined period are different from each other (Step S971: NO), the resource allocation control section 109 controls the transmission processing section 106 to transmit a response ACK over AICH to the mobile station 20 (Step S977). Then, the base station 10 receives data transmitted by the mobile station 20 using a default transmission profile as described above (Step S978) and returns to the step of waiting to receive a preamble (Step S970).

4. Fourth Exemplary Embodiment

A method for allocating uplink common channel resources according to a fourth exemplary embodiment of the present invention is an example of a combination of the methods according to the first to third exemplary embodiments. As will be described below as an example, a base station transmits common resource allocation information to mobile stations depending on radio conditions. Then, dedicated scheduling, common scheduling, and default scheduling are performed when ACK is a response over AICH to a preamble from a mobile station, while dedicated scheduling and preamble retransmission are performed when NACK is a response over AICH. Thereby, RACH message part transmissions from the mobile stations are spread over the default resources, common allocated resources, and dedicated allocated resources. Thus, uniform loads on and stable quality of the uplink common channel, RACH, can be achieved.

Figure 23:
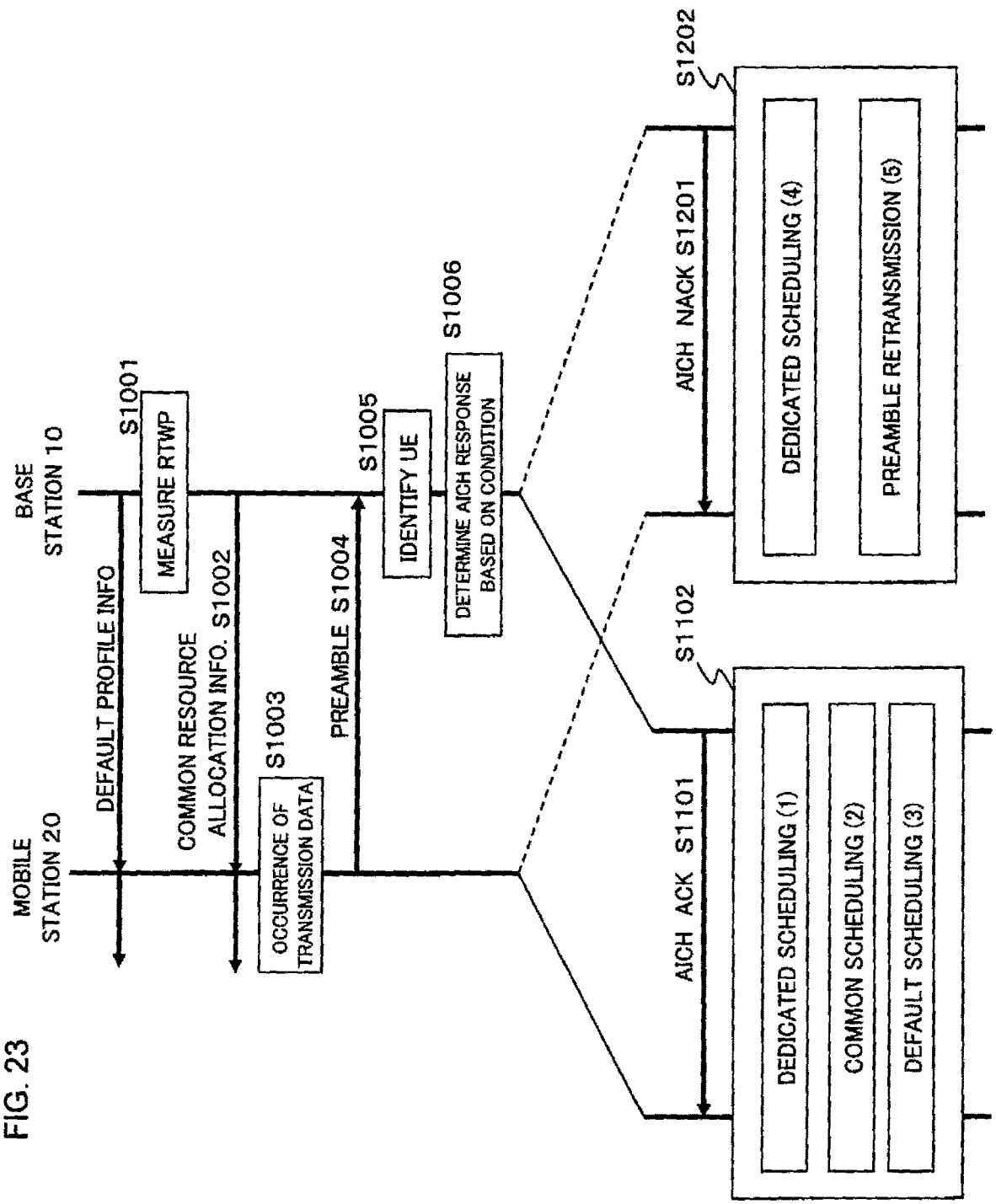
FIG. 23 is a schematic sequence diagram of a resource allocation method according to a fourth exemplary embodiment of the present invention.

FIG. 23 is a schematic sequence diagram showing the resource allocation method according to the fourth exemplary embodiment of the present invention. A base station 10 transmits default profile information to all mobile stations in its cell at predetermined time intervals. Further, the radio quality measurement section 108 of the base station 10 measures RTWP (Nc) (Step S1001). This RTWP measurement is repeated at predetermine time intervals.

The resource allocation control section 109 of the base station 10 determines common resource allocation information $R_{common}$, based on the measured RTWP value Nc as described already, and transmits it to the mobile stations (or some designated mobile stations) (Step S1002). The reception processing section 202 of any mobile station 20 that has received the common resource allocation information $R_{common}$ retains this common resource allocation information $R_{common}$ for a predetermined period Tc.

At the mobile station 20, upon the occurrence of transmission data in the buffer 205 (Step S1003), the transmission data control section 204 transmits a preamble to the base station 10 as described already (Step S1004). The base station 10, after receiving the preamble, identifies the mobile station 20 based on a predetermined criterion (Step S1005) and also determines whether or not the same SPIG and PSRC have been received from a different mobile station within a predetermined period (Step S1006). If there is no mobile station that has transmitted the same preamble, the base station 10 transmits a response ACK over AICH to the mobile station 20 (Step S1101), and a process S1102 including dedicated scheduling, common scheduling, and default scheduling is performed. If the same preamble has been transmitted, the base station 10 transmits a response NACK over AICH to the mobile station 20 (Step S1201), and a process S1202 including dedicated scheduling and preamble retransmission is performed. Hereinafter, the processes S1102 and S1202 will be described more specifically.

4.1) ACK Dedicated Scheduling

Figure 24:
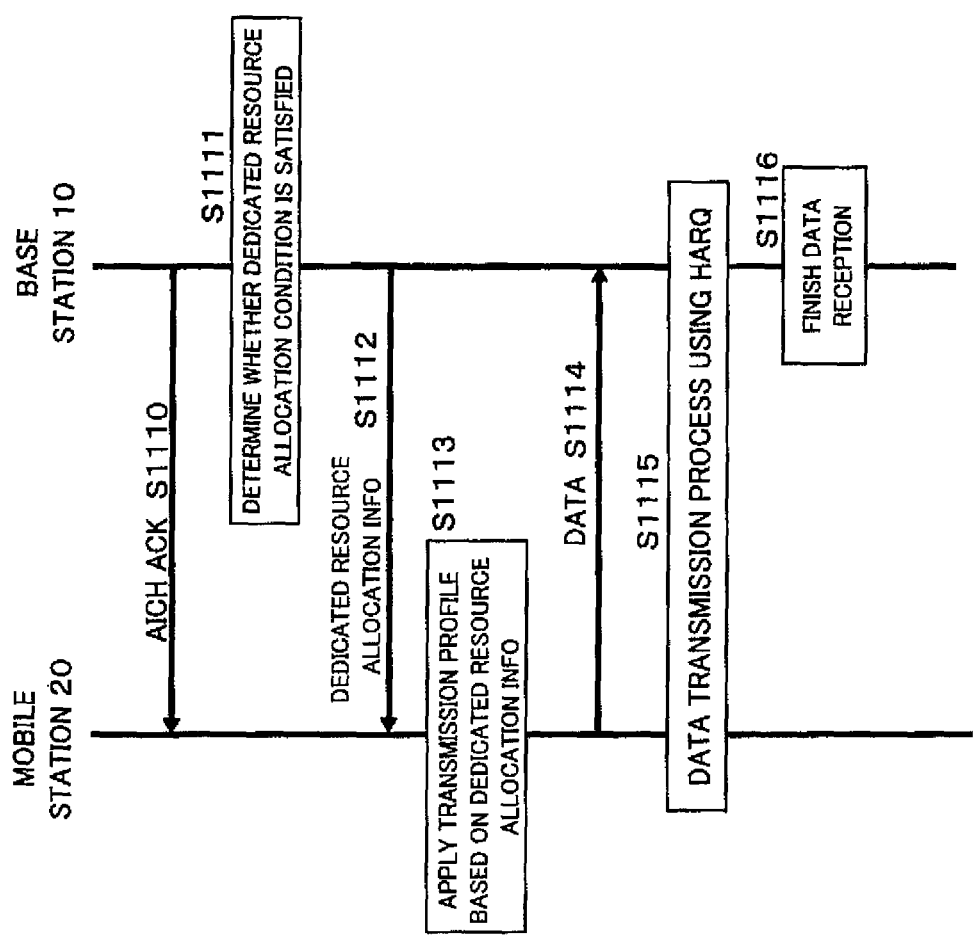
FIG. 24 is a sequence diagram of a data transmission sequence using a transmission profile determined based on dedicated resource allocation information when ACK is received, in the resource allocation method according to the fourth exemplary embodiment of the present invention.

FIG. 24 is a sequence diagram of a data transmission sequence using a transmission profile determined based on dedicated resource allocation information when ACK is received, in the resource allocation method according to the fourth exemplary embodiment of the present invention. When the base station 10 has transmitted a response ACK over AICH to the mobile station 20 (Step S1110), the base station 10 determines whether or not the above-described predetermined dedicated resource allocation condition is satisfied (Step S1111). If the predetermined dedicated resource allocation condition is satisfied, the base station 10 transmits dedicated resource allocation information $R_{dedicated}$ to the mobile station 20 identified (Step S1112). The mobile station 20, in case of having received the dedicated resource allocation information $R_{dedicated}$, calculates a RACH message part transmission profile Tx_Profile based on the dedicated resource allocation information $R_{dedicated}$ (Step S1113) and transmits data to the base station 10 by using the transmission profile Tx_Profile (Step S1114).

When the base station 10 has received the data from the mobile station 20 based on the dedicated resource allocation information $R_{dedicated}$, the base station 10 initiates a HARQ-supported data transmission process (Step S1115) and, if a transmission acknowledgment is ACK, finishes data reception (Step S1116). The HARQ-supported data transmission process is as described in the first exemplary embodiment, and therefore the description thereof will be omitted.

4.2) ACK Common Scheduling

Figure 25B:
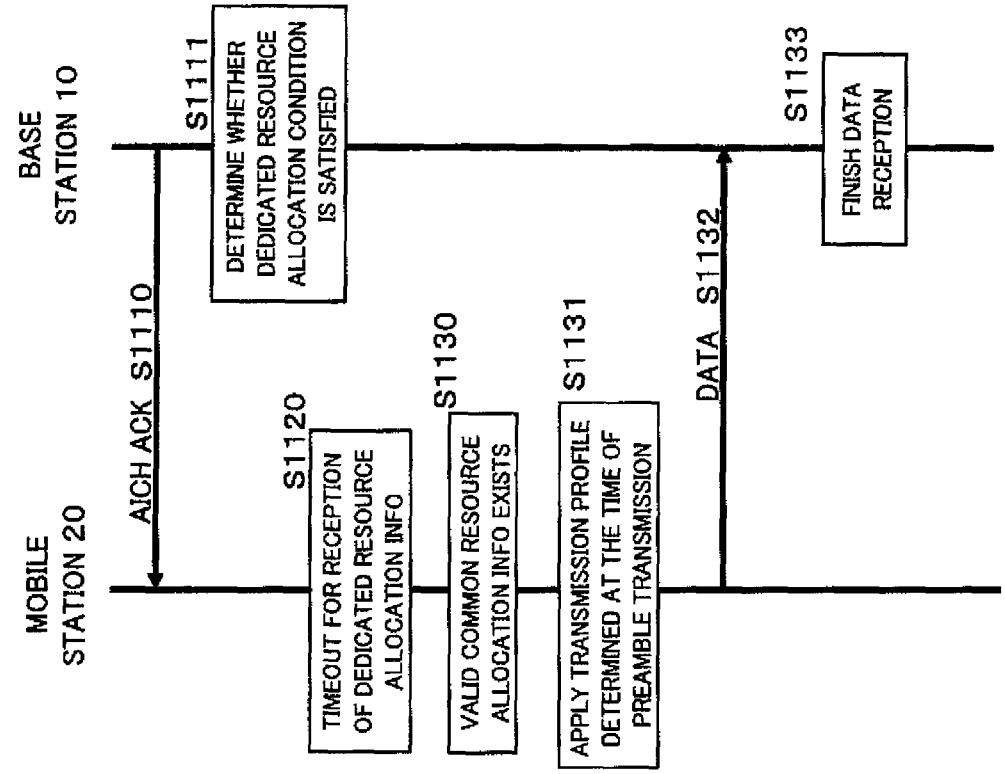
FIG. 25B is a sequence diagram of a data transmission sequence using a default transmission profile when ACK is received, in the resource allocation method according to the fourth exemplary embodiment of the present invention.
Figure 25A:
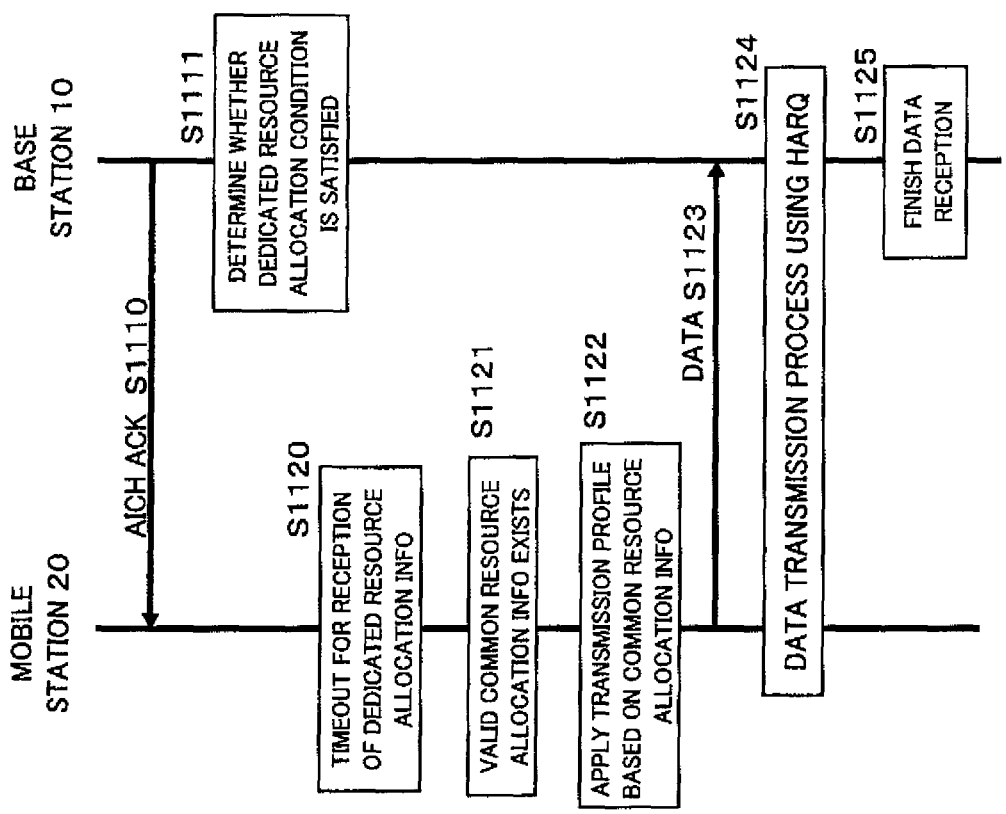
FIG. 25A is a sequence diagram of a data transmission sequence using a transmission profile determined based on common resource allocation information when ACK is received, in the resource allocation method according to the fourth exemplary embodiment of the present invention.

FIG. 25A is a sequence diagram of a data transmission sequence using a transmission profile determined based on common resource allocation information when ACK is received, in the resource allocation method according to the fourth exemplary embodiment of the present invention. Here, it is assumed that the common resource allocation information transmitted at Step S1002 in FIG. 23 is validly retained.

When the base station 10 has transmitted a response ACK over AICH to the mobile station 20 (Step S1110), the base station 10 determines whether or not the above-described predetermined dedicated resource allocation condition is satisfied (Step S1111). Dedicated resource allocation information $R_{dedicated}$ is not transmitted to the mobile station 20 in case where this condition is not satisfied. Accordingly, when the mobile station 20 has not received dedicated resource allocation information $R_{dedicated}$ within the predetermine period Td (Step S1120), the resource allocation information processing section 203 determines whether or not the mobile station 20 retains valid common resource allocation information $R_{common}$. If the mobile station 20 validly retains the common resource allocation information $R_{common}$ (Step S1121), the mobile station 20 calculates a RACH message part transmission profile Tx_Profile as described already (Step S1122) and transmits a RACH message part to the base station 10 by using the transmission profile Tx_Profile (Step S1123).

The base station 10 initiates a HARQ process if the source mobile station of the RACH message part received is "a mobile station that receives common resource allocation information and that can execute a HARQ-supported data transmission process" (Step S1124). The base station 10 transmits transmission acknowledgment information ACK finally and finishes data reception (Step S1125).

4.3) ACK Default Scheduling

FIG. 25B is a sequence diagram of a data transmission sequence using a default transmission profile when ACK is received, in the resource allocation method according to the fourth exemplary embodiment of the present invention. When the base station 10 has transmitted a response ACK over AICH to the mobile station 20 (Step S1110), the base station 10 determines whether or not the above-described predetermined dedicated resource allocation condition is satisfied (Step S1111). Dedicated resource allocation information $R_{dedicated}$ is not transmitted to the mobile station 20 when this condition is not satisfied. Accordingly, if the mobile station 20 has not received dedicated resource allocation information $R_{dedicated}$ within the predetermined period Td (Step S1120), the resource allocation information processing section 203 determines whether or not the mobile station 20 retains valid common resource allocation information $R_{common}$. If the mobile station 20 does not retain valid common resource allocation information $R_{common}$ (Step S1130), the transmission data control section 204 determines a default transmission profile based on the PSCR and PSIG used in the preamble transmission, transmission timing, and default profile information (available TFS, TF_offset corresponding to each TF, and $\Delta P_{p-m}$) (Step S1131). Then, the mobile station 20 transmits a RACH message part to the base station 10 by using this default transmission profile (Step S1132). As described above, in case where the base station 10 has received data in the RACH message part not within the validity period of the common resource allocation information $R_{common}$, the reception processing section 102 finishes data reception (Step S1133).

4.4) NACK Dedicated Scheduling

Figure 26:
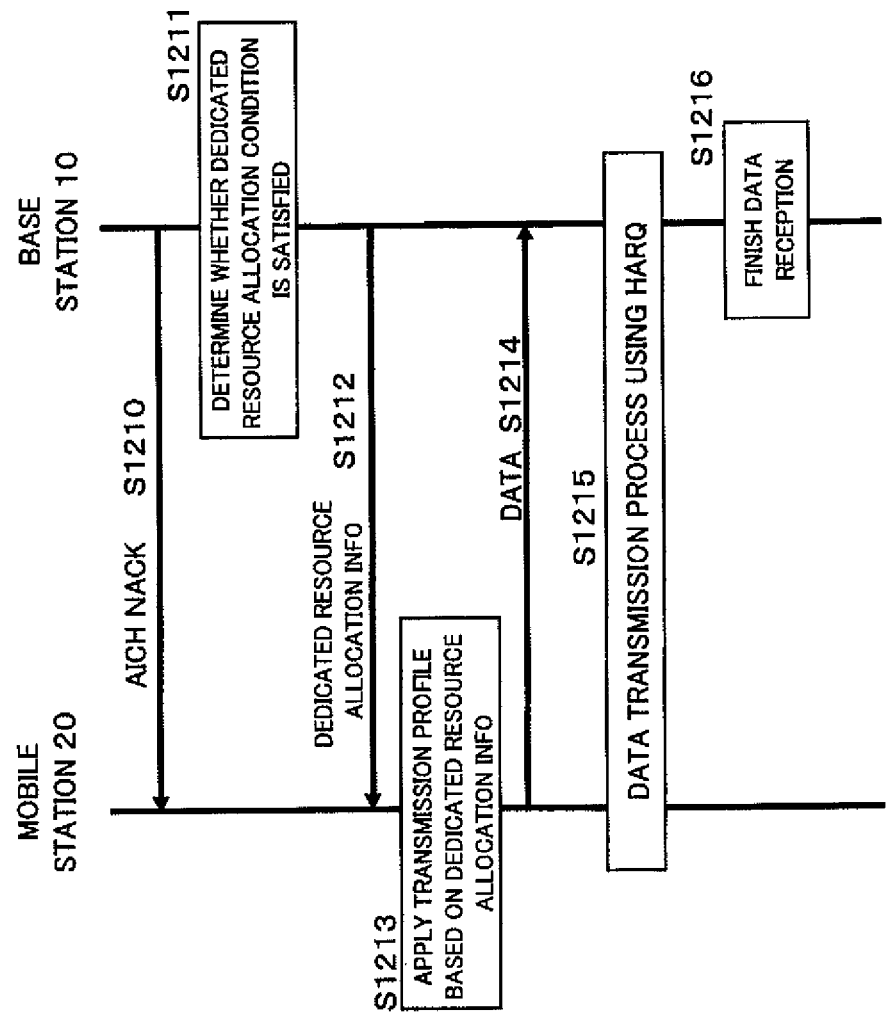
FIG. 26 is a sequence diagram of a data transmission sequence using a transmission profile determined based on dedicated resource allocation information when NACK is received, in the resource allocation method according to the fourth exemplary embodiment of the present invention.

FIG. 26 is a sequence diagram of a data transmission sequence using a transmission profile determined based on dedicated resource allocation information when NACK is received, in the resource allocation method according to the fourth exemplary embodiment of the present invention. When the base station 10 has transmitted a response NACK over AICH to the mobile station 20 (Step S1210), the base station 10 determines whether or not the above-described predetermined dedicated resource allocation condition is satisfied (Step S1211). When the predetermined dedicated resource allocation condition is satisfied, the base station 10 transmits dedicated resource allocation information $R_{dedicated}$ to the mobile station 20 identified (Step S1212). The mobile station 20, in case of having received the dedicated resource allocation information $R_{dedicated}$, calculates a RACH message part transmission profile Tx_Profile based on the dedicated resource allocation information $R_{dedicated}$ (Step S1213) and transmits data to the base station 10 by using the transmission profile Tx_Profile (Step S1214).

When the base station 10 has received the data from the mobile station 20 based on the dedicated resource allocation information $R_{dedicated}$, the base station 10 initiates a HARQ-supported data transmission process (Step S1215). If a transmission acknowledgment is ACK, the base station 10 finishes data reception (Step S1216). The HARQ-supported data transmission process is as described in the first exemplary embodiment, and therefore the description thereof will be omitted.

4.5) NACK Preamble Retransmission

Figure 27:
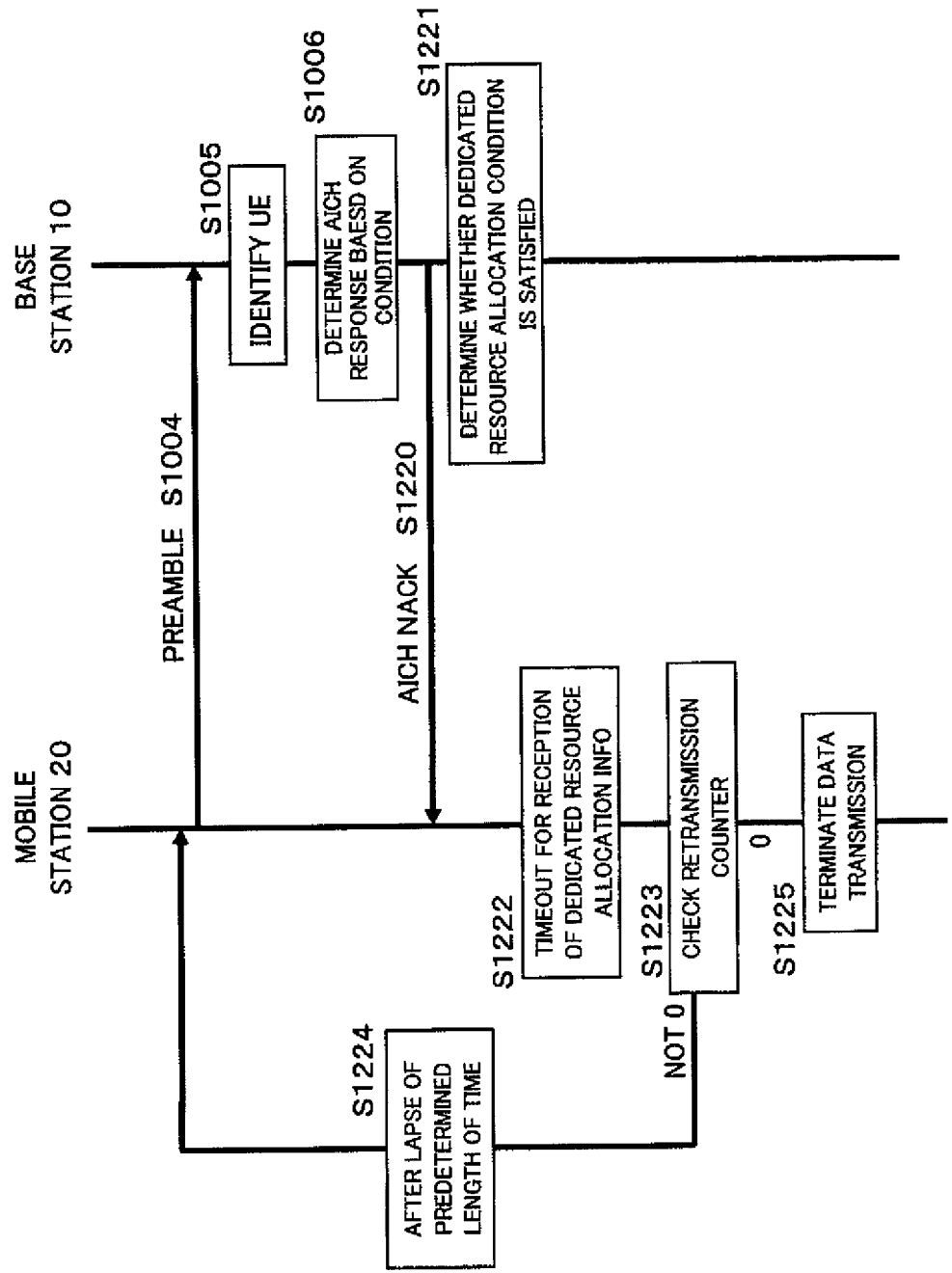
FIG. 27 is a sequence diagram showing a preamble retransmission procedure in case where a response over AICH is NACK, in the resource allocation method according to the fourth exemplary embodiment of the present invention.

FIG. 27 is a sequence diagram showing a preamble retransmission procedure in case where a response over AICH is NACK, in the resource allocation method according to the fourth exemplary embodiment of the present invention. The same reference symbols and numerals as in FIG. 23 are given to similar steps to those of the sequence in FIG. 23, and therefore the description thereof will be omitted.

Referring to FIG. 27, when the base station 10 has transmitted a response NACK over AICH to the mobile station 20 (Step S1220), the base station 10 determines whether or not the predetermined dedicated resource allocation condition is satisfied (Step S1221). Dedicated resource allocation information $R_{dedicated}$ is not transmitted when it is determined that this dedicated resource allocation condition is not satisfied. In this case, since the mobile station 20 does not receive dedicated resource allocation information $R_{dedicated}$ within a predetermined period Td (Step S1222), the mobile station 20 checks a retransmission counter (Step S1223) and, unless the retransmission counter shows 0, retransmits a preamble after a lapse of a predetermined length of time (Steps S1224 and S1004) and then decrements the retransmission counter by one. When the retransmission counter has reached 0 without receiving a response ACK over AICH, the mobile station 20 terminates data transmission (Step S1225).

4.6) Operation of Mobile Station

Figure 28:
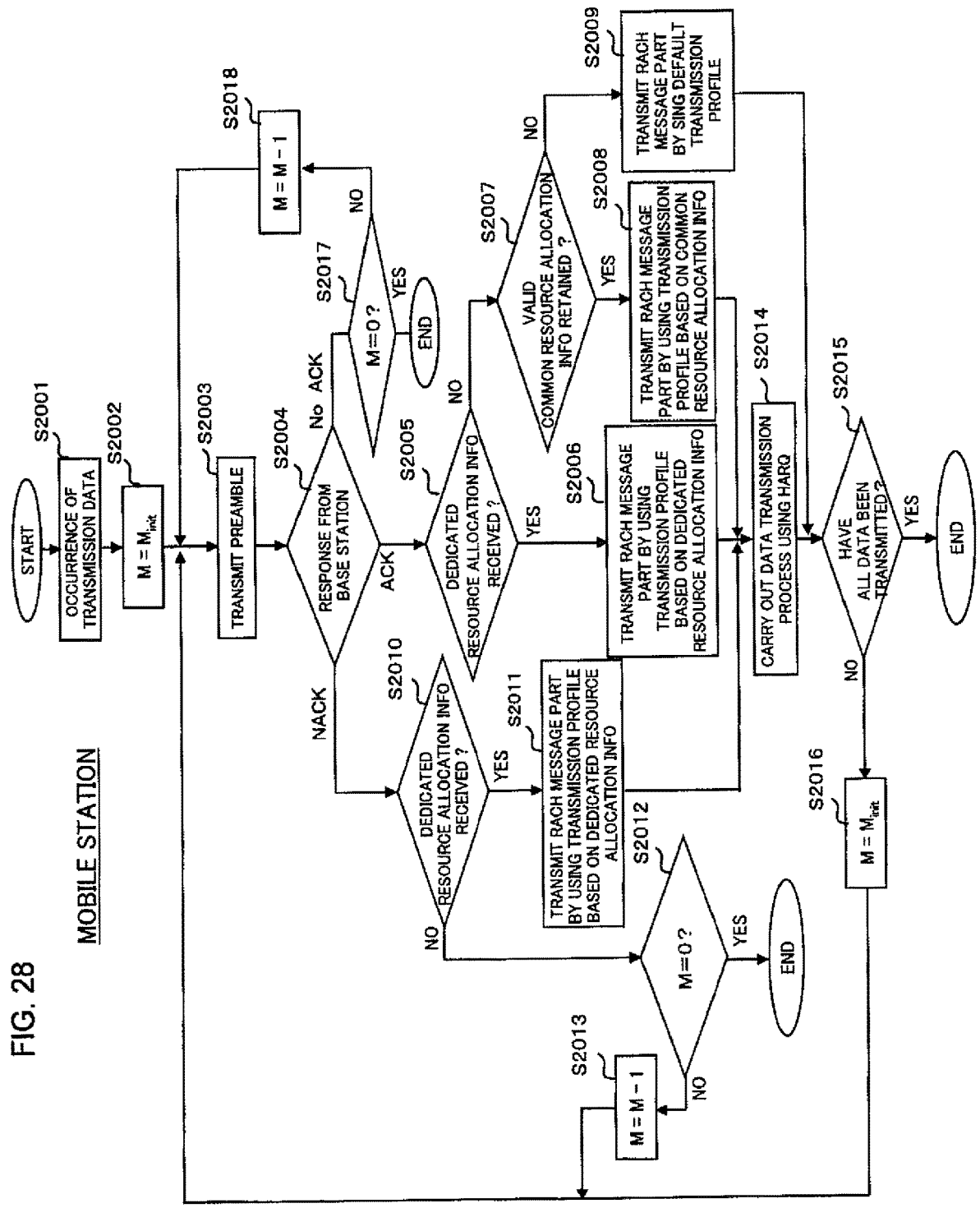
FIG. 28 is a flow chart showing operations of the mobile station in the fourth exemplary embodiment of the present invention.

FIG. 28 is a flow chart showing operations of a mobile station in the fourth exemplary embodiment of the present invention. At the mobile station 20, first, upon the occurrence of uplink transmission data in the buffer 205 (Step S2001), the transmission data control section 204 initializes the retransmission counter M (Step S2002), selects one out of available PSIGs, and transmits preamble-part code data including a set of a PSCR and the selected PSIG (Step S2003). Subsequently, upon the receipt of a response ACK over AICH from the base station 10 after a predetermined length of time (Step S2004), the mobile station 20 determines whether or not it receives dedicated resource allocation information $R_{dedicated}$ within the predetermined period Td (Step S2005).

If the mobile station 20 has received the dedicated resource allocation information $R_{dedicated}$ within the predetermined period Td (Step S2005: YES), the resource allocation information processing section 203 transmits data to the base station 10 by using a transmission profile Tx_Profile determined based on the dedicated resource allocation information $R_{dedicated}$ (Step S2006). If the mobile station 20 has not received the dedicated resource allocation information $R_{dedicated}$ within the predetermined period Td (Step S2005: NO), the resource allocation information processing section 203 determines whether or not the mobile station 20 retains valid common resource allocation information $R_{common}$ (Step S2007). When the valid common resource allocation information $R_{common}$ is retained (Step S2007: YES), the mobile station 20 determines a RACH message part transmission profile Tx_Profile as described already and transmits a RACH message part to the base station 10 by using the transmission profile Tx_Profile (Step S2008).

When no valid common resource allocation information $R_{common}$ is retained (Step S2007: NO), the transmission data control section 204 determines a default transmission profile based on the PSCR and PSIG used in the preamble transmission, transmission timing, and default profile information (available TFS, TF_offset corresponding to each TF, and $\Delta P_{p-m}$), and then transmits a RACH message part to the base station 10 by using the default transmission profile (Step S2009).

In case of having received a response NACK over AICH (Step S2004), the mobile station 20 determines whether or not it receives dedicated resource allocation information $R_{dedicated}$ within the predetermined period Td (Step S2010). When the dedicated resource allocation information $R_{dedicated}$ is received within the predetermined period Td (Step S2010: YES), the mobile station 20 determines a RACH message part transmission profile Tx_Profile based on the dedicated resource allocation information $R_{dedicated}$ and transmits data by using the transmission profile Tx_Profile (Step S2011).

When the dedicated resource allocation information $R_{dedicated}$ is not received even after the predetermined period Td has passed (Step S2010: NO), the resource allocation information processing section 203 determines whether or not the retransmission counter M shows 0 (Step S2012). When 0 is not shown (Step S2012: NO), the transmission counter M is decremented by one (Step S2013), and then the process goes back to the step of preamble transmission processing (Step S2003). When the retransmission counter M shows 0 (Step S2012: YES), the mobile station 20 finishes transmission processing.

In case where data transmission is performed by using a transmission profile based on the dedicated resource allocation information $R_{dedicated}$ or common resource allocation information $R_{common}$ (Step S2006, S2008, or S2011), the mobile station 20 initiates a HARQ-supported data transmission process (Step S2014) and then determines whether or not the transmission of all data is complete (Step S2015). In case where the RACH message part is transmitted to the base station 10 by using the default transmission profile (Step S2009), the mobile station 20, without carrying out a HARQ process, determines whether or not the transmission of all data is complete (Step S2015).

If transmission data remains in the buffer 205 (Step S2015: NO), the transmission data control section 204 initializes the retransmission counter M (Step S2016) and returns to the step of preamble transmission processing (Step S2003). When no transmission data remains (Step S2015: YES), the mobile station 20 finishes transmission processing.

In addition, in case where no response over AICH is received even after the predetermined length of time has passed (Step S2004: No ACK), the resource allocation information processing section 203 determines whether or not the retransmission counter M shows 0 (Step S2017). When 0 is not shown (Step S2017: NO), the mobile station 20 decrements the retransmission counter M by one (Step S2018) and returns to the step of preamble transmission processing (Step S2003). When the retransmission counter M shows 0 (Step S2017: YES), the mobile station 20 finishes transmission processing.

4.7) Operation of Base Station

Figure 29:
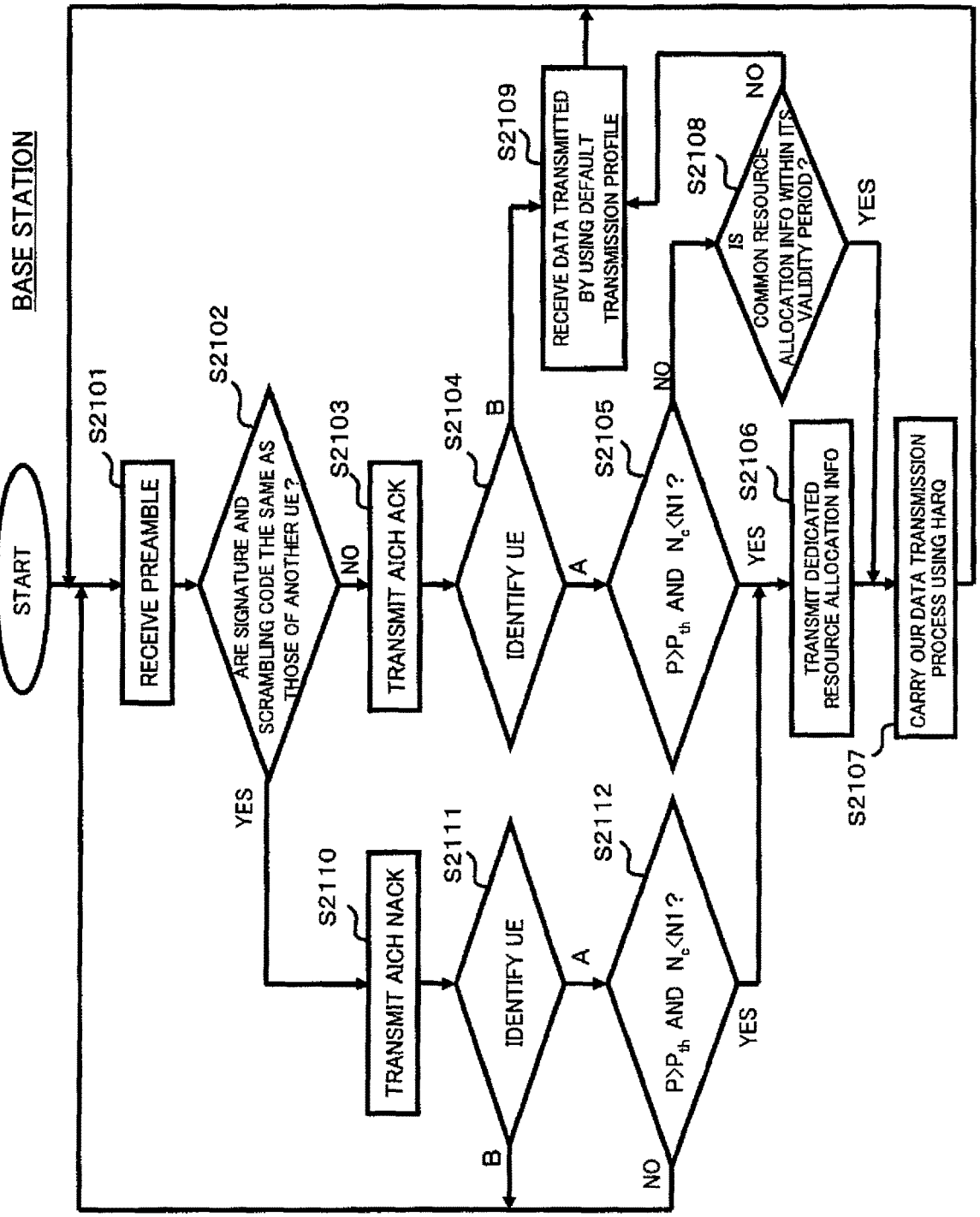
FIG. 29 is a flow chart showing operations of the base station in the fourth exemplary embodiment of the present invention.

FIG. 29 is a flow chart showing operations of a base station in the fourth exemplary embodiment of the present invention. It is assumed that default profile information is transmitted from the base station 10 to mobile stations at predetermined time intervals as described above.

At the base station 10, upon the receipt of a preamble from a mobile station 20 (Step S2101), the resource allocation control section 109 determines whether or not the PSIG and PSRC of this preamble are the same as those of a preamble from another mobile station received within a predetermined period (Step S2102). If these PSIGs and PSRCs are different from each other (Step S2102: NO), the resource allocation control section 109 controls the transmission processing section 106 to transmit a response ACK over AICH to the mobile station 20 in question (Step S2103).

Moreover, the resource allocation control section 109 determines the type of the mobile station 20 by the received preamble as described above (Step S2104). For example, it is determined whether or not the mobile station 20 in question is "a mobile station that is a target for transmission of dedicated resource allocation information and that is capable of executing a HARQ-supported data transmission process." (Hereinafter, the type of such a mobile station will be referred to as "type A," and other types will be collectively referred to as "type B.") Here, when the mobile station 20 is of type A (Step S2104: A), the resource allocation control section 109 determines whether or not the above-described predetermined dedicated resource allocation condition ($P>P_{th}$ and $Nc<N1$) is satisfied (Step S2105).

When the dedicated resource allocation condition is satisfied (Step S2105: YES), the resource allocation control section 109 generates dedicated resource allocation information $R_{dedicated}$ indicating resources that are not used by the another mobile station as described above and transmits the dedicated resource allocation information $R_{dedicated}$ to the mobile station 20 (Step S2106). Thereafter, the base station 10 carries out a HARQ-supported data transmission process using a transmission profile based on the dedicated resource allocation information $R_{dedicated}$ (Step S2107) and, after having received data completely, returns to the step of waiting to receive a preamble (Step S2108). In case where the dedicated resource allocation condition is not satisfied (Step S2105: NO), the resource allocation control section 109 determines whether or not the transmitted common resource allocation information $R_{common}$ is within its validity period (Step S2108). If the common resource allocation information $R_{common}$ is within its validity period (Step S2108: YES), the base station 10 carries out a HARQ-supported data transmission process (Step S2107) and then returns to the step of waiting to receive a preamble (Step S2101). In case where the mobile station 20 is of type B (Step S2104: B), or where the common resource allocation information $R_{common}$ is not within its validity period (Step S2108: NO), the base station 10 receives data transmitted by the mobile station 20 using a default transmission profile (Step S2109) and then returns to the step of waiting to receive a preamble (Step S2101).

In addition, if the preambles received within the predetermined period from the mobile station 20 and the another mobile station are the same (Step S2102), the resource allocation control section 109 controls the transmission processing section 106 to transmit a response NACK over AICH to the mobile station 20 (Step S2110).

The resource allocation control section 109 further determines the type of the mobile station 20 by the received preamble (Step S2111). For example, it is determined whether the mobile station 20 is of type A or type B. Here, when the mobile station 20 is of type A (Step S2111: A), the resource allocation control section 109 further determines whether or not the above-described predetermined dedicated resource allocation condition ($P>P_{th}$ and $Nc<N1$) is satisfied (Step S2112).

When the dedicated resource allocation condition is satisfied (Step S2112: YES), the control process moves to Step S2106 as described above. In case where the dedicated resource allocation condition is not satisfied (Step S2112: NO), or where the mobile station 20 is of type B (Step S2111: B), the process goes back to the step of waiting to receive a preamble (Step s2101).

5. Various Examples

In view of the description given hereinabove, in a system according to the present invention, a mobile station transmits a preamble to a base station, which, upon receipt of the preamble, transmits a response back to the mobile station. The mobile station then transmits data to the base station depending on the response received. The base station includes a means for transmitting a predetermined transmission profile and further transmitting resource allocation information. The mobile station, when transmitting the data to the base station, uses a transmission profile determined based on the resource allocation information in case of having received the resource allocation information, but uses the predetermined transmission profile in case of having received no resource allocation information.

According to a first example of the present invention, a mobile station transmits a preamble to a base station, which, upon receipt of the preamble, transmits a response back to the mobile station, which then transmits data to the base station depending on the response received. The base station notifies dedicated resource allocation information to the mobile station individually, and the mobile station transmits the data to the base station by using a transmission profile determined based on the dedicated resource allocation information notified. In case of receiving no dedicated resource allocation information, the mobile station transmits the data to the base station by using a transmission profile determined at the time of preamble transmission.

According to a second example of the present invention, in a system where a base station transmits common resource allocation information and a mobile station receives the common resource allocation information, the mobile station transmits data to the base station by using a transmission profile determined based on the common resource allocation information in case where the mobile station receives a response to a preamble but does not receive dedicated resource allocation information.

According to a third example of the present invention, in a system where a first mobile station transmits a first preamble by using at least one of a predetermined preamble signature, a preamble scrambling code and a transmission timing, and where a second mobile station transmits a second preamble by using at least one of a predetermined preamble signature, a preamble scrambling code and a transmission timing that are different from those of the first mobile station, a base station receives the first and second preambles and identifies the first mobile station based on information on at least one of the preamble signature, preamble scrambling code and transmission timing.

Moreover, when the base station has received data, the base station notifies the first mobile station of transmission acknowledgment information with respect to the data. In case where the notification indicates a failure in receipt of the data, the first mobile station transmits retransmission data to the base station, and the base station can combine the retransmission data with the data.

A mobile station transmits a preamble to a base station. The base station transmits a response back to the mobile station upon receipt of the preamble and further transmits dedicated resource allocation information to the mobile station when a predetermined resource allocation condition is satisfied. The mobile station, in case of having received the dedicated resource allocation information, transmits data to the base station over an uplink common channel by using a transmission profile determined based on the dedicated resource allocation information.

A mobile station transmits a preamble to a base station. In case where the base station have received the preamble, the base station transmits a first response (corresponding to ACK) to the mobile station when a predetermined condition for second response transmission is not satisfied, but transmits a second response (corresponding to NACK) when the predetermined condition for second response transmission is satisfied, and, when a predetermined resource allocation condition is satisfied, further transmits dedicated resource allocation information to the mobile station. The mobile station, in case of having received the dedicated resource allocation information, transmits data to the base station over an uplink common channel by using a transmission profile determined based on the dedicated resource allocation information.

As described above, each mobile station performs transmission by using resources that a base station allocates to the mobile station. Accordingly, the base station reduces the quantity of resources to allocate to each mobile station when preamble transmissions from mobile stations concentrate, and increases the quantity of resources to allocate to each mobile station when a small number of mobile stations perform preamble transmission, whereby it is possible to prevent the uplink from falling in an overloaded state. Hence, the resources can be used most efficiently, and the average data transmission rate can be increased.

Moreover, the base station transmits a predetermined transmission profile to all mobile stations and further transmits resource allocation information to part of the mobile stations. Since a mobile station that has received the resource allocation information transmits data by using a transmission profile different from that of the others, uniform loads on the uplink, as well as stable quality thereof, can be achieved. To lessen the probability of the occurrence of degradation in link quality, unused resource margins are reduced, whereby the uplink capacity can be increased.

Furthermore, even when a mobile station cannot perform transmission by using a profile corresponding to a preamble the mobile station has transmitted, the mobile station transmits data by using another profile. Accordingly, the mobile station does not need to repeat a transmission procedure beginning with preamble transmission. Consequently, the delay of data transmission can be reduced.

Since resources are allocated to each mobile station individually through the transmission of common resource allocation information and dedicated resource allocation information, it is possible to transmit the dedicated resource allocation information only to part of the mobile stations and to differentiate the resources to be allocated to the other many mobile stations through the common resource allocation information. Accordingly, the consumption of resources on the downlink common channel used to transmit the dedicated resource allocation information can be reduced, while the flexibility in allocating resources to each mobile station is secured. Thus, many resources need not be secured on the downlink common channel for transmitting the resource allocation information, and the downlink capacity can be increased.

The type of a mobile station is identified by its preamble, and resource allocation is performed only for mobile stations in need. Even if a mobile station cannot receive dedicated resource allocation information or common resource allocation information, the mobile station can apply predetermined transmission profile information. Accordingly, data transmissions to the base station can be made without changing mobile stations, and backward compatibility can be secured.

Since the type of a mobile station is identified by its preamble, it is possible to avoid a waste of resources occurring in such a manner that dedicated resource allocation is performed for a mobile station that cannot receive dedicated resource allocation information and the allocated dedicated resource is left unused. Thereby, radio resources can be used efficiently, and further, the consumption of resources on the downlink common channel through which dedicated resource allocation is performed can be reduced. Accordingly, the uplink and downlink capacities, as well as throughputs, are increased.

The base station transmits dedicated resource allocation information to a mobile station over the downlink common channel only in case where the mobile station can perform more efficient uplink common channel transmission than it does by using predetermined allocated resources. Accordingly, resource allocation can be performed while reducing the consumption of resources on the downlink common channel, and the downlink capacity is increased.

Mobile stations transmit preambles to the base station, and the base station transmits responses to the mobile stations depending on the receipts of the preambles. At the same time, the base station performs dedicated resource allocation only for part of the mobile stations. Accordingly, even when receiving requirements from many mobile stations simultaneously, the base station transmits a predetermined response to all the mobile stations, whereby it is possible to control the many mobile stations while reducing the consumption of resources on the downlink common channel. At the same time, this transmission of a predetermined response also means that the base station can transmit to all the mobile stations a response that will stop the mobile stations retransmitting preambles. Accordingly, preamble retransmissions from the mobile stations can also be suppressed, and the uplink and downlink capacities are increased.

Additionally, it is also possible for the base station to transmit common resource allocation information that is available to a specific group of mobile stations.

The present invention is applicable to radio communications systems in which a plurality of radio communication devices make access to a base station by using an uplink common channel.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A mobile station comprising:
a processor configured to randomly select a first signature from a set of available signatures;
a transmitter configured to transmit, to a base station, a first preamble by using the first signature and transmission power; and
a receiver configured to receive, from the base station, a response to the first signature on an Acquisition Indicator channel (AICH), and to receive first information from the base station, and to receive second information from the base station,
wherein the transmitter is configured to transmit first data by using third information if the response to the first signature is an acknowledgement, the third information being determined based on the first signature and the first information,
wherein the transmitter is configured to transmit a second preamble if the response to the first signature is a negative acknowledgement and the second information has not been received with the negative acknowledgement,
wherein the transmitter is configured to transmit second data by using fourth information if the response to the first signature is the negative acknowledgement and the second information has been received with the negative acknowledgement, the second data being different from the second preamble, the fourth information being determined based on the second information.

2. The mobile station according to claim 1,
wherein the processor is configured to change a value of a transmission counter by one,
wherein the transmitter is configured to transmit a third preamble to the base station if the value of the transmission counter is not a predetermined value,
wherein the transmitter is configured not to transmit the third preamble to the base station if the value of the transmission counter is the predetermined value.

3. The mobile station according to claim 2,
wherein the processor is configured to decrease the value of the transmission counter by one,
wherein the processor is configured to randomly select a second signature from the set of available signatures and the transmitter is configured to transmit the third preamble by using the second signature to the base station if the receiver receives no response to the first signature from the base station on the Acquisition Indicator channel (AICH) and the value of the transmission counter is equal to or more than 1,
wherein the mobile station is configured to exit a procedure related to a preamble transmission if the receiver receives no response to the first signature from the base station on the Acquisition Indicator channel (AICH) and the value of the transmission counter is equal to 0.

4. The mobile station according to claim 3,
wherein the first signature is different from the second signature.

5. The mobile station according to claim 3,
wherein the first signature is identical with the second signature.

6. A base station comprising:
a receiver configured to receive a first preamble from a mobile station, the first preamble being transmitted using a first signature and transmission power, the first signature being randomly selected from a set of available signatures; and
a transmitter configured to transmit a response to the first signature to the mobile station on an Acquisition Indicator channel (AICH), and to transmit first information to the mobile station, and to transmit second information to the mobile station,
wherein the receiver is configured to receive first data transmitted by using third information if the response to the first signature is an acknowledgement, the third information being determined based on the first signature and the first information,
wherein the receiver is configured to receive a second preamble from the mobile station if the response to the first signature is a negative acknowledgement and the second information has not been received with the negative acknowledgement by the mobile station,
wherein the receiver is configured to receive, from the mobile station, second data transmitted by using fourth information if the response to the first signature is a negative acknowledgement and the second information has been received with the negative acknowledgement by the mobile station, the second data being different from the second preamble, the fourth information being determined based on the second information.

7. The base station according to claim 6,
wherein the receiver is configured to receive a third preamble from the mobile station, the third preamble being transmitted if a value of a transmission counter is not a predetermined value, the value of the transmission counter being changed by one,
wherein the third preamble is not transmitted if the value of the transmission counter is the predetermined value.

8. The base station according to claim 7,
wherein the receiver is configured to receive the third preamble from the mobile station, the third preamble being transmitted using a second signature, the second signature being selected randomly from the set of available signatures if the transmitter transmits no response to the first signature to the mobile station on the Acquisition Indicator channel (AICH) and the value of the transmission counter is equal to or more than 1, the value of the transmission counter being decreased by one,
wherein the third preamble is not transmitted if the transmitter transmits no response to the first signature to the mobile station on the Acquisition Indicator channel (AICH) and the value of the transmission counter is equal to 0.

9. The base station according to claim 8,
wherein the first signature is different from the second signature.

10. The base station according to claim 8,
wherein the first signature is identical with the second signature.

11. A communication method of a mobile station comprising:
randomly selecting a first signature from a set of available signatures;
transmitting, to a base station, a first preamble by using the first signature and transmission power;
receiving, from the base station, a response to the first signature on an Acquisition Indicator channel (AICH), and first information, and second information;
transmitting first data by using third information if the response to the first signature is an acknowledgement, the third information being determined based on the first signature and the first information;

transmitting a second preamble if the response to the first signature is a negative acknowledgement and the second information has not been received with the negative acknowledgement; and transmitting second data by using fourth information if the response to the first signature is a negative acknowledgement and the second information has been received with the negative acknowledgement, the second data being different from the second preamble, the fourth information being determined based on the second information.

12. The communication method according to claim 11, further comprising:

changing a value of a transmission counter by one, transmitting a third preamble to the base station if the value of the transmission counter is not a predetermined value; and controlling so as not to transmit the third preamble to the base station if the value of the transmission counter is the predetermined value.

13. The communication method according to claim 12, further comprising:

decreasing the value of the transmission counter by one, randomly selecting a second signature from the set of available signatures, and transmitting the third preamble by using the second signature to the base station if the mobile station receives no response to the first signature from the base station on the Acquisition Indicator channel (AICH) and the value of the transmission counter is equal to or more than 1; and controlling so as to exit a procedure related to a preamble transmission if the mobile station receives no response to the first signature from the base station on the Acquisition Indicator channel (AICH) and the value of the transmission counter is equal to 0.

14. The communication method according to claim 13, wherein the first signature is different from the second signature.

15. The communication method according to claim 13, wherein the first signature is identical with the second signature.

16. A communication method of a base station comprising:

receiving a first preamble from a mobile station, the first preamble being transmitted using a first signature and transmission power, the first signature being randomly selected from a set of available signatures;

transmitting a response to the first signature to the mobile station on an Acquisition Indicator channel (AICH), and first information to the mobile station, and second information to the mobile station;

receiving first data, the first data transmitted by using third information if the response to the first signature is an acknowledgement, the third information being determined based on the first signature and the first information;

receiving a second preamble, the second preamble from the mobile station if the response to the first signature is a negative acknowledgement and the second information has not been received with the negative acknowledgement by the mobile station; and receiving, from the mobile station, second data transmitted by using fourth information if the response to the first signature is a negative acknowledgement and the second information has been received with the negative acknowledgement by the mobile station, the second data being different from the second preamble, the fourth information being determined based on the second information.

17. The communication method according to claim 16, further comprising:

receiving a third preamble from the mobile station, the third preamble being transmitted by the mobile station if a value of a transmission counter is not a predetermined value, the value of the transmission counter being changed, by the mobile station, by one, wherein the third preamble is not transmitted by the mobile station if the base station transmits no response to the first signature to the mobile station on the Acquisition Indicator channel (AICH) and the value of the transmission counter is the predetermined value.

18. The communication method according to claim 17, further comprising:

receiving the third preamble from the mobile station, the third preamble being transmitted using a second signature by the mobile station, the second signature being selected randomly from the set of available signatures by the mobile station if the base station transmits no response to the first signature to the mobile station on the Acquisition Indicator channel (AICH) and the value of the transmission counter is equal to or more than 1, the value of the transmission counter being decreased, by the mobile station, by one, wherein the third preamble is not transmitted by the mobile station if the base station transmits no response to the first signature to the mobile station on the Acquisition Indicator channel (AICH) and the value of the transmission counter is equal to 0.

19. The communication method according to claim 18, wherein the first signature is different from the second signature.

20. The communication method according to claim 18, wherein the first signature is identical with the second signature.

* * * * *